(12) United States Patent
Shimoda et al.

(10) Patent No.: US 7,716,053 B2
(45) Date of Patent: May 11, 2010

(54) INFORMATION TRANSMISSION METHOD AND INFORMATION TRANSMISSION SYSTEM IN WHICH CONTENT IS VARIED IN PROCESS OF INFORMATION TRANSMISSION

(75) Inventors: Noriyuki Shimoda, Tokyo (JP); Wataru Nakanishi, Tokyo (JP); Taku Kihara, Tokyo (JP); Daichi Katagiri, Tokyo (JP); Makoto Osaki, Tokyo (JP)

(73) Assignee: Sega Corporation, Tokyo (JP)

( * ) Notice: Subject to any disclaimer, the term of this patent is extended or adjusted under 35 U.S.C. 154(b) by 7 days.

(21) Appl. No.: 11/588,324

(22) Filed: Oct. 27, 2006

(65) Prior Publication Data

US 2007/0213975 A1    Sep. 13, 2007

Related U.S. Application Data

(63) Continuation of application No. PCT/JP2005/008368, filed on May 6, 2005.

(30) Foreign Application Priority Data

May 17, 2004    (JP) ............................. 2004-146053

(51) Int. Cl.
*A63F 9/24*    (2006.01)
*G06F 13/00*    (2006.01)
*G06F 17/27*    (2006.01)
*G10L 11/00*    (2006.01)
*H04M 1/00*    (2006.01)

(52) U.S. Cl. .......................... 704/270; 455/566; 455/40; 463/1; 463/40; 704/9

(58) Field of Classification Search .................. 463/40; 704/270
See application file for complete search history.

(56) References Cited

U.S. PATENT DOCUMENTS

2002/0035467 A1*    3/2002    Morimoto et al. .............. 704/9
2002/0055835 A1*    5/2002    Carcoba Olivares et al. ... 704/9

FOREIGN PATENT DOCUMENTS

| JP | 2002-032605 A | 1/2002 |
| JP | 2002-245203 A | 8/2002 |
| JP | 2003-085096 A | 3/2003 |

* cited by examiner

*Primary Examiner*—David R Hudspeth
*Assistant Examiner*—Justin W Rider
(74) *Attorney, Agent, or Firm*—Dickstein Shapiro LLP

(57) ABSTRACT

A system and method for transmitting messages among terminals with increasing uncertainty. According to one embodiment, players in a game exchange text messages via wireless computing devices. A first player selects from among a menu of fixed phrases and inserts words within the phrase to complete a message. When the message is received at a second wireless computing device, the message may be degraded by, for example, by removing one or more words or reducing a reliability rating. As the message is passed to third and subsequent wireless computer devices, the message can be further degraded. By degrading the message, the curiosity of a player can be peaked, thus resulting in more engaging game play.

7 Claims, 35 Drawing Sheets

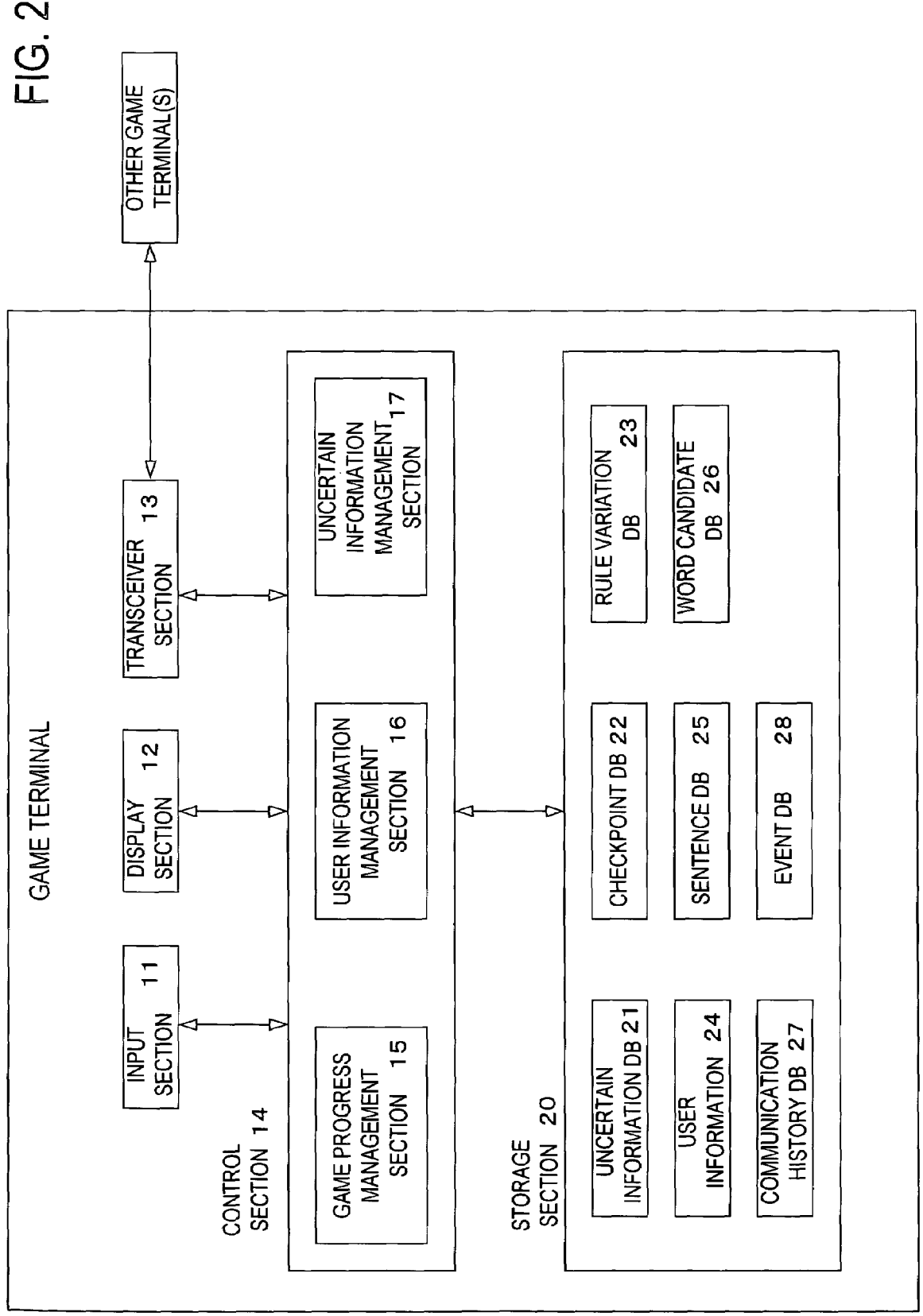

FIG. 3

SENTENCE DB — 25

| | SENTENCE CODE | FIXED PHRASE | WORD ITEM |
|---|---|---|---|
| INITIAL FIXED PHRASES | 001 | __ SEEMS TO THINK THAT __ IS A RIVAL | SUBJECT, RIVAL |
| | 002 | __ SEEMS TO THINK THAT __ IS A FRIEND | SUBJECT, FRIEND |
| | 003 | __ SEEMS TO HAVE GOT __ AT __ | SUBJECT, LOCATION, ITEM |
| | 004 | IT SEEMS THAT IF YOU DEFEAT __ YOU CAN GET __ | ENEMY, ITEM |
| | 005 | IT SEEMS THAT IF YOU COOPERATE WITH __ YOU CAN RECEIVE __ | APPEARING CHARACTER, ITEM |
| | 006 | IT SEEMS THAT IF YOU USE __ YOU CAN DEFEAT __ | ENEMY, ITEM |
| | ... | ... | ... |
| VARIATION FIXED PHRASES | 100 | IT SEEMS THAT THERE IS A PERSON WHO THINKS __ IS A RIVAL | RIVAL |
| | 101 | IT SEEMS THAT THERE IS A PERSON WHO THINKS __ IS A FRIEND | FRIEND |
| | 102 | IT SEEMS THAT THERE IS A PERSON WHO OBTAINED __ AT __ | LOCATION, ITEM |
| | 103 | IT SEEMS THAT THERE IS A PERSON WHO OBTAINED __ | ITEM |
| | ... | ... | ... |
| CHECKPOINT CORRESPONDING FIXED PHRASES | 501 | IT SEEMS THAT __ HAS USED A DISGUISE AND DECEIVED __ | SUBJECT, APPEARING CHARACTER |
| | 502 | IT SEEMS THAT __ HAS USED A __ AND HAS FOUND SNOW WHITE | SUBJECT, ITEM |
| | 503 | IT SEEMS THAT __ DEFEATED __ AT __ AND HAS OBTAINED __ | SUBJECT, LOCATION, ENEMY, ITEM |
| | 504 | IT SEEMS THAT __ HAS DEFEATED __ AND CLEARED THE GAME | SUBJECT, ENEMY |
| | ... | ... | ... |
| EVENT FLAG CORRESPONDING FIXED PHRASES | 1001 | IT SEEMS THAT IF YOU WIN FIVE TIMES IN A ROW THIS MONTH YOU CAN RECEIVE A RARE ITEM | — |
| | ... | ... | ... |

FIG. 4

USER INFORMATION

| SERIAL NUMBER | NAME | SEX | LOCATION | RIVALS | FRIENDS | RARE ITEMS |
|---|---|---|---|---|---|---|
| 00118 | TARO | MALE | TOKYO | NO SETTING | NO SETTING | SILVER MEDAL |

UNCERTAIN INFORMATION DB

| ID | SENTENCE CODE | WORDS | DEGREE OF ACCURACY | SENDING LIMIT NUMBER | REMAINING NUMBER OF TIMES OF SENDING | RECEIVING LIMIT NUMBER | TYPE | EVENT FLAG | VALID PERIOD LIMIT | REGION |
|---|---|---|---|---|---|---|---|---|---|---|
| 00118-2003.12.12-001 | 001 | HANAKO, ROSE | 85 | 3 | 2 | 3 | 0 | 0 | NO SETTING | NO SETTING |
| 00118-2004.01.11-010 | 004 | FISH SHOP, SILVER MEDAL | 50 | 3 | 0 | 3 | 0 | 0 | NO SETTING | NO SETTING |
| ... | ... | ... | ... | ... | ... | ... | ... | ... | ... | ... |
| 20059-2004.01.25-018 | 1001 | — | 100 | 3 | 3 | 3 | 1 | 1 | 2004.01.31 | TOKYO |

00118—2003.12.12—001

SERIAL NUMBER — DATE — CONSECUTIVE NUMBER

FIG. 7

EVENT DB

| SENTENCE CODE | EVENT CONTENT | ON/OFF |
|---|---|---|
| 1001 | IF YOU HAVE FIVE CONSECUTIVE WINS WITHIN THE MONTH IN WHICH INFORMATION IS OBTAINED, YOU WILL BE GIVEN A GOLD MEDAL | OFF |
| ... | ... | ... |

FIG. 8

CHECKPOINT DB

| CHECKPOINT CODE | ON/OFF | SENTENCE CODE | WORDS | CONDITION |
|---|---|---|---|---|
| 001 | OFF | 501 | SUBJECT, APPEARING CHARACTER = "WOLF" | PLAYER DECEIVES WOLF |
| 002 | OFF | 502 | SUBJECT, ITEM = "GLASS SLIPPER" | PLAYER FINDS SNOW WHITE |
| 003 | OFF | 503 | SUBJECT, LOCATION = "OGRE ISLAND", ENEMY = "GIANT OGRE", ITEM = "SCROLL" | PLAYER DEFEATS GIANT OGRE |
| 004 | ON | 504 | SUBJECT, ENEMY = "KING OF EVIL" | PLAYER DEFEATS KING OF EVIL |

FIG. 9

COMMUNICATION HISTORY DB

| COMMUNICATION OTHER-PARTY NAME | DATE/TIME OF COMMUNICATION |
|---|---|
| TARO | 2003. 12. 05 |
| HANAKO | 2003. 12. 12 |
| DAISUKE | 2003. 12. 15 |

FIG. 10

RULE VARIATION DB

| RECEIVED SENTENCE CODE | DEGREE OF ACCURACY | POST-VARIATION SENTENCE CODE | WORD ITEMS |
|---|---|---|---|
| 001 | 60 OR MORE | NO VARIATION | SUBJECT, TARGET RIVAL |
| | LESS THAN 60 | 100 | TARGET RIVAL |
| 002 | 60 OR MORE | NO VARIATION | SUBJECT, FRIEND |
| | LESS THAN 60 | 101 | FRIEND |
| 003 | 80 OR MORE | NO VARIATION | SUBJECT, LOCATION, ITEM |
| | 60 OR MORE | 102 | LOCATION, ITEM |
| | LESS THAN 60 | 103 | ITEM |
| ... | ... | ... | ... |
| | ... | ... | ... |

FIG. 11

WORD CANDIDATE DB

| WORD ITEM | NUMBER | POST-REPLACEMENT WORD |
|---|---|---|
| SUBJECT AND RIVAL | 001 | TARO |
| | 002 | HANAKO |
| | 003 | DAISUKE |
| | 004 | SHINJI |
| LOCATION | 001 | OGRE ISLAND |
| | 002 | DRAGON CASTLE |
| | 003 | ISOLATED VILLAGE |
| | 004 | PORT TOWN |
| ITEM | 001 | SWORD |
| | 002 | ARMOR |
| | 003 | SHIELD |
| | 004 | DRUG |
| ENEMY | 001 | GIANT OGRE |
| | 002 | GOBLIN |
| | 003 | WATER SPIRIT |
| | 004 | MERMAID |
| ... | ... | ... |

FIG. 18A

SENDING PROCESS 1 — S302

↓

S331 SERIAL NUMBER IN FORWARDING HISTORY?

- Yes → S332 PREDETERMINED TIME ELAPSED?
  - No → S334 DO NOT SEND
  - Yes ↓
- No ↓

S333 SEND → S304

FIG. 18B

SENDING PROCESS 2 — S302

↓

S335 OBTAIN STATUS OF OTHER PARTY'S EVENT DB

↓

S336 EVENT FLAG ON?

- → S334 DO NOT SEND
- → S333 SEND → S304

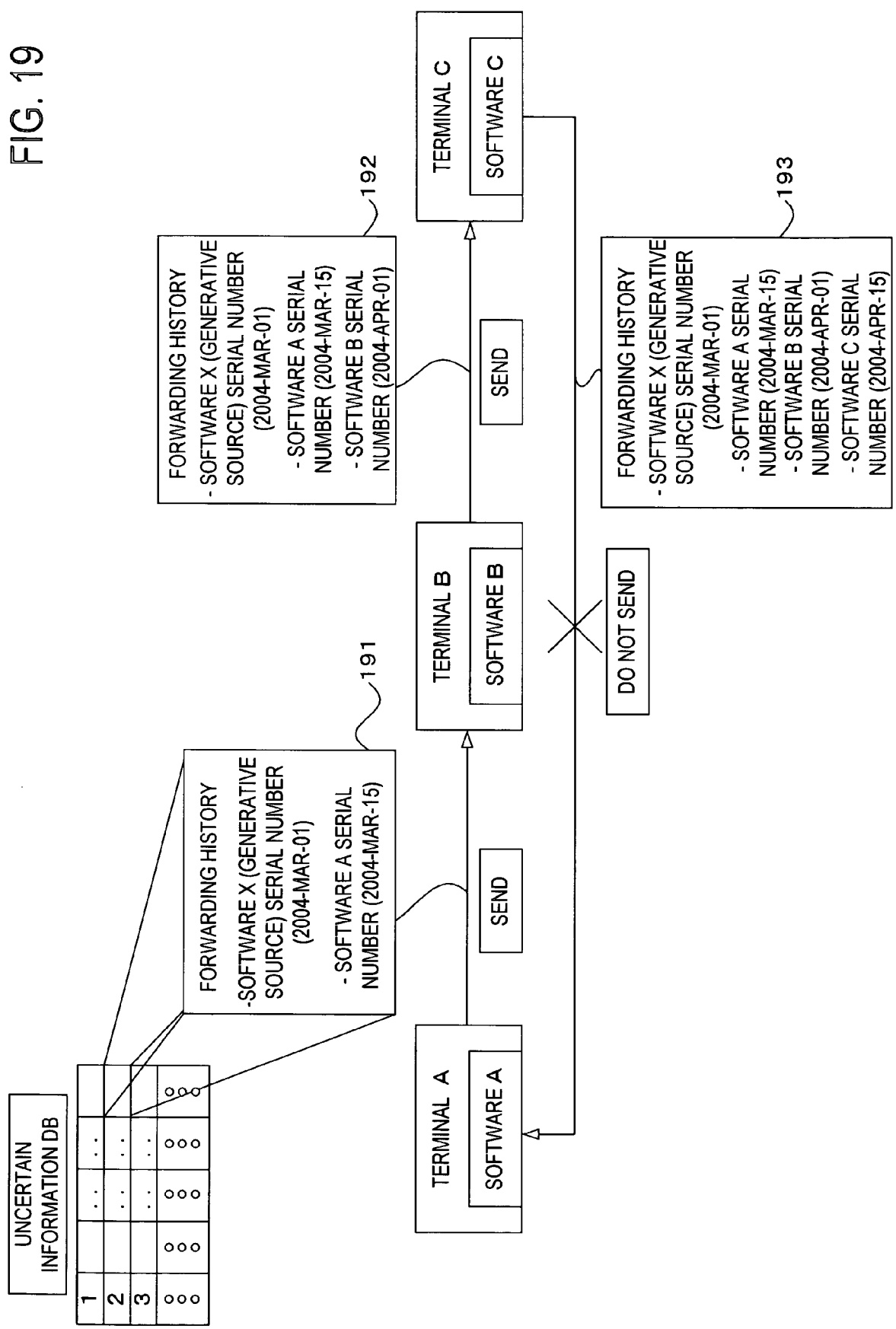

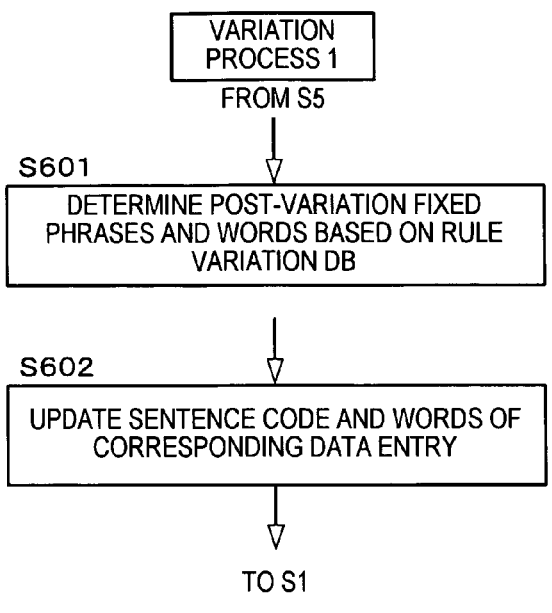
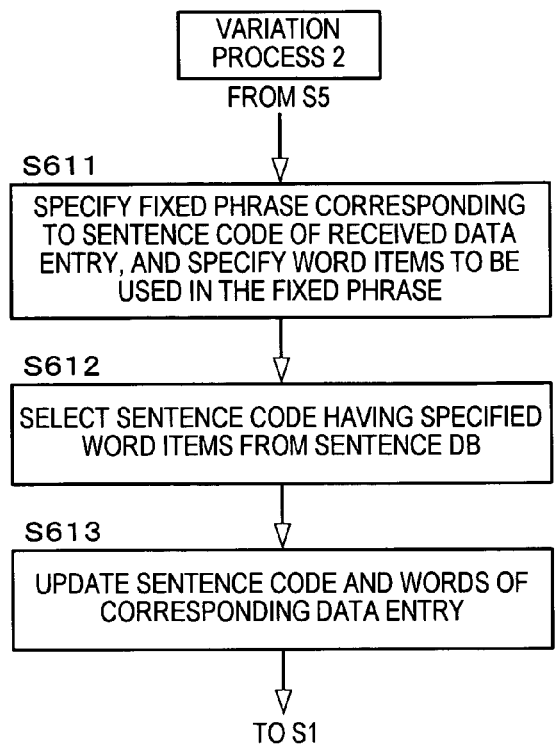
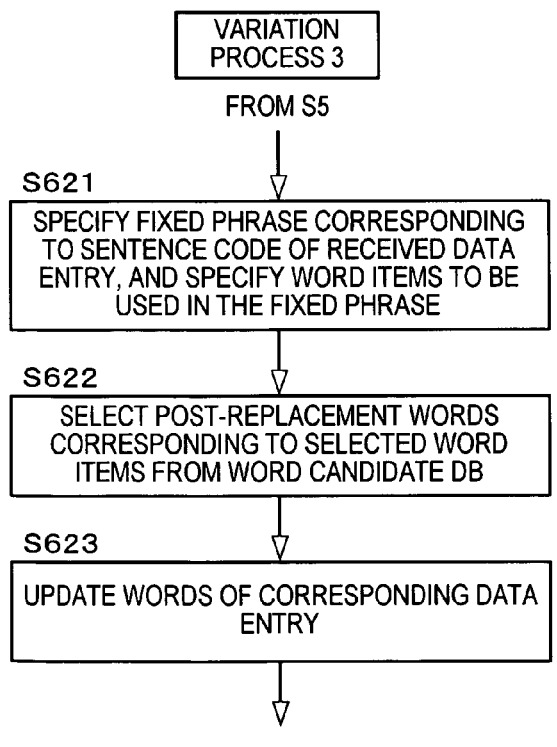
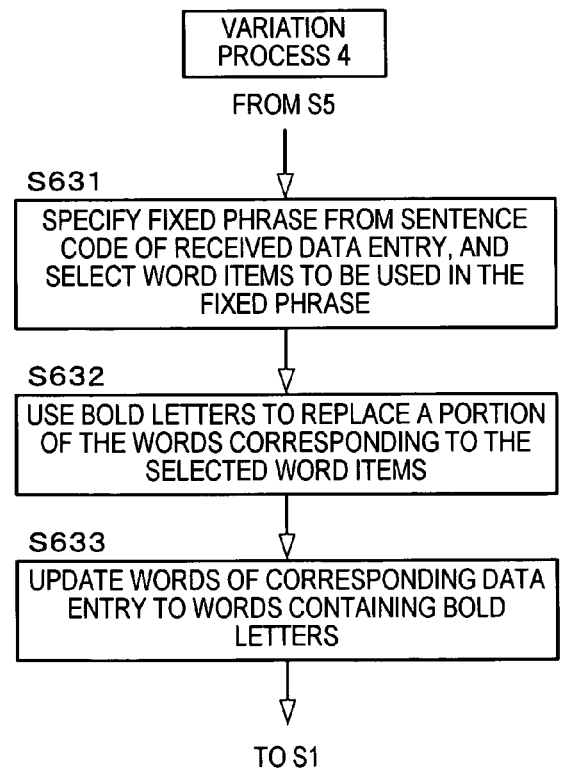

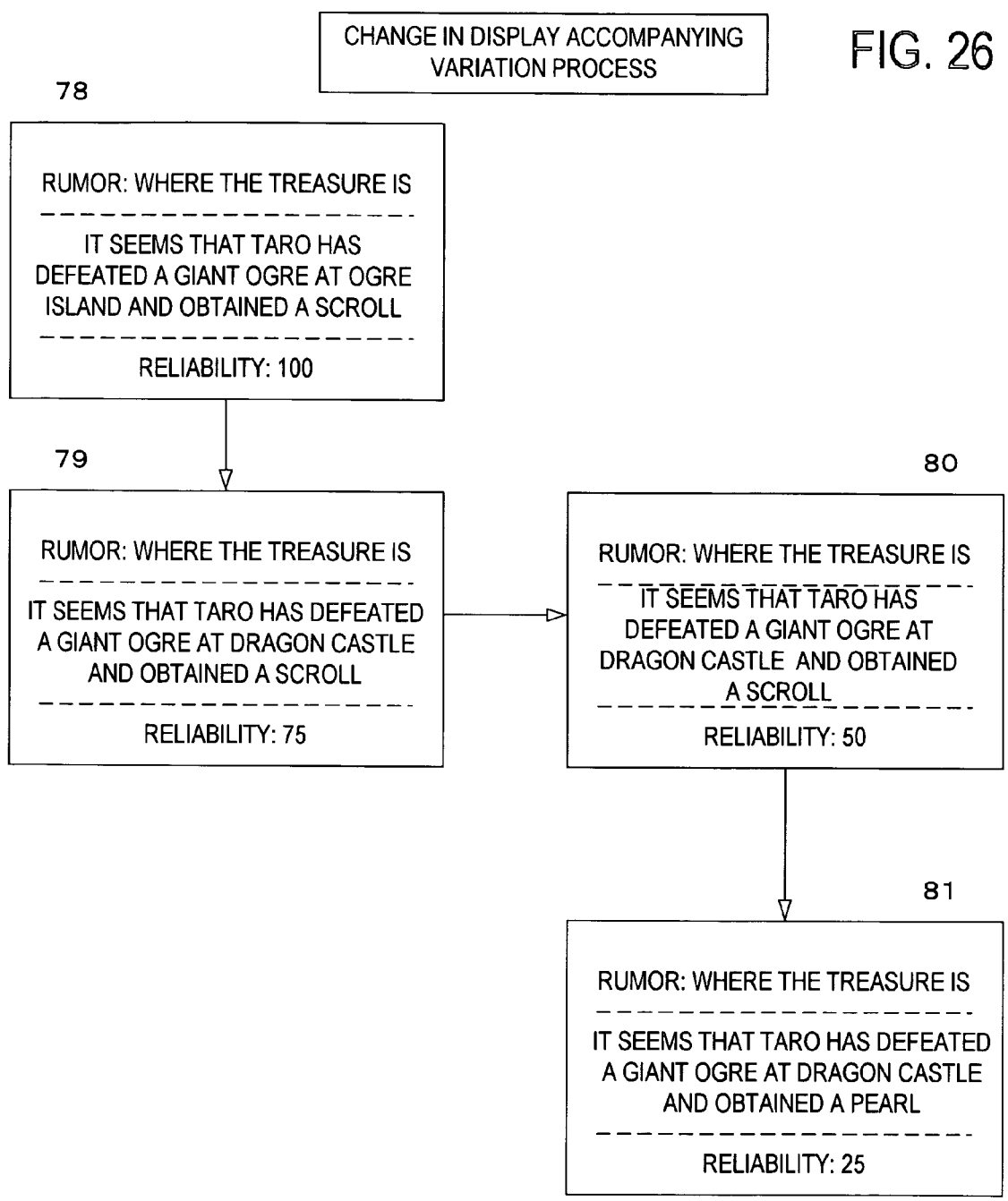

FIG. 27

CHANGE IN DISPLAY ACCOMPANYING VARIATION PROCESS

82

RUMOR: WHERE THE TREASURE IS
--------------------------------
IT SEEMS THAT TARO HAS DEFEATED A GIANT OGRE AT OGRE ISLAND AND OBTAINED A SCROLL
--------------------------------
RELIABILITY: 100

83

RUMOR: WHERE THE TREASURE IS
--------------------------------
IT SEEMS THAT TARO HAS DEFEATED A GIANT OGRE AT ** ISLAND AND OBTAINED A SCROLL
--------------------------------
RELIABILITY: 75

84

RUMOR: WHERE THE TREASURE IS
--------------------------------
IT SEEMS THAT * HAS DEFEATED A GIANT OGRE AT  ISLAND AND OBTAINED A SCROLL
--------------------------------
RELIABILITY: 50

FIG. 33

| SOFTWARE MANAGEMENT TABLE | |
|---|---|
| SERIAL NUMBER DIVISION | GAME TITLE |
| 00001~09999 | ADVENTURE OF A |
| 10000~19999 | RACING OF B |
| ... | ... |

FIG. 34

| USER AUTHORIZATION DB |
|---|
| SERIAL NUMBER |
| 00118 |
| 00374 |
| 20059 |
| ... |

FIG. 35

| RELAY TERMINAL AUTHORIZATION DB |
|---|
| ADDRESS |
| A1.B1.C1.D1 |
| A2.B2.C2.D2 |
| A3.B3.C3.D3 |
| ... |

INFORMATION TRANSMISSION METHOD AND INFORMATION TRANSMISSION SYSTEM IN WHICH CONTENT IS VARIED IN PROCESS OF INFORMATION TRANSMISSION

CROSS REFERENCE TO RELATED APPLICATIONS

This application is a continuation of International Application No. PCT/JP2005/008368, filed on May 6, 2005, now pending, herein incorporated by reference. Further, this application is based upon and claims the benefit of priority from the prior Japanese Patent Application No. 2004-146053, filed on May 17, 2004, the entire contents of which are incorporated herein by reference.

TECHNICAL FIELD

The present invention relates to an information transmission method and an information transmission system for transmitting uncertain information.

BACKGROUND ART

Mainstream conventional video games have involved executing a program on a standalone information terminal such as a PC (personal computer), a PDA (personal digital assistant), a mobile telephone, a home-use game machine installed in a home, and a commercial game machine installed in amusement facilities such as game centers, with the user (player) playing the game alone. In recent years, ways of playing have been proposed that involve connecting multiple information terminals and having multiple players participate simultaneously in a single video game.

For small scale forms of connections this may involve connecting two or more information terminals using a cable and carrying out a competitive game in which independently operated characters compete against each other, and for large scale forms of connections this may involve connecting information terminals via a network to a server that provides a service and players with information terminals connected to the same server play the same game. Furthermore, in cases in which multiple information terminals are connected, there are games that have a chat function in which players have a conversation with each other on a display screen by players inputting text information using an input unit such as a game controller.

In this way, various information is exchanged between connected information terminals. Information that is exchanged includes various information such as information that indicates an opponent's strength or condition, information that has been inputted by players using the chat function, and information that synchronizes the game's progress status between the information terminals, but the form of information transmission is definite information transmission in which there is no change in the content of the information between the sending side and the receiving side.

On the other hand, realistically, in the process of propagating information it is common for uncertain elements to be included gradually and for the information to gradually depart from the truth. Accordingly, the authenticity of information that a person has obtained often may not be certain and the content of the information may change from how it was initially as it passes between multiple persons. However, since there may be some truth contained in information whose authenticity is not certain, a person's curiosity is stimulated to want to confirm the authenticity when that person has obtained information of interest to himself.

Accordingly, if there was a transmission method in which, in the process of propagating the information between information terminals, information (the content thereof) was varied so as to increase its uncertainty, information that was initially accurate would gradually change in due course to information that contained uncertainty by propagating information using that transmission method. Thus, a player's curiosity would be stimulated by receiving information having uncertain authenticity, thereby enabling the player's interest in the game to be held for a long period and making the game more captivating.

It should be noted in regard to conventional technologies that no documented information of effective prior art could be discovered relating to a transmission method in which (the content of) information is varied to increase its uncertainty in the process of propagating information among information terminals.

However, the information transmission carried out between conventional information terminals has involved only definite information transmission. Also, in conventional information transmission methods, agreement between players is sometimes a prerequisite for connecting information terminals, which limits the range of information transmission.

Furthermore, when an unspecified large number of players have a conversation using the chat function, the conversation does not become lively unless the players are familiar with each other and the conversation does not continue unless there is a leader skilled at conversation. And without active conversation, little information is transmitted. Furthermore, obtained information is shared only between players capable of participating at the same time and the information that can be brought in is limited to information known by the participating players.

Further still, when participating in a chat using a mobile-type information terminal (a mobile phone or the like), the input unit is inferior compared to a keyboard of a PC for example, and therefore adequate information transmission is not carried out since players are reluctant to chat due to the tendency for lags in conversation (text input).

DISCLOSURE OF INVENTION

The present invention has been devised in light of these issues and it is an object therein to provide an information transmission method by which information can be automatically propagated via an information terminal and uncertainty is increased due to the process of propagation.

With a first aspect of the present invention, the above object is achieved by providing an application program for executing a recreational information transmission method to be carried out among a plurality of information terminals configured to be capable of mutual information exchange via a communication channel, wherein by installing the application program on the information terminals respectively, a plurality of fixed phrases for sentence generation are stored, and the program having: a step of generating a sentence by inserting a word, which is inputted to the information terminal or selected in relation to an event to be created in the information terminal, into a fixed phrase for sentence generation selected from the plurality of fixed phrases for sentence generation; a sending step of sending the generated sentence via the communication channel to another of the information terminals; a step of receiving the sentence that is sent via the communication channel in the another information terminal due to execution of the application program; a determination step of determining whether or not to vary the received sentence; a first forwarding step of, when the received sentence is not to be varied in the determination step, forwarding the received sentence to a different information terminal; and a second forwarding step of, when the received sentence is to be varied in the determination step, generating a new sentence by selecting from the plurality of fixed phrases for sentence generation a second fixed phrase for sentence generation associated with a first fixed phrase for sentence generation contained in the received sentence and replacing the first fixed phrase for sentence generation with the second fixed phrase for sentence generation, or by replacing the inserted word contained in the received sentence with another word or symbol, and forwarding the generated new sentence via the communication channel to the different information terminal.

Furthermore, with a second aspect of the present invention, the above object is achieved by further providing to the application program of the first aspect, a step of calculating a degree of accuracy of a received sentence based on forwarding count information contained in data received from another information terminal and/or an extent of change of the received sentence, wherein a degree of accuracy standard value is defined in advance for each of the stored plurality of fixed phrases for sentence generation, and in the determination step, a process is carried out in which a value of the calculated degree of accuracy is compared with the degree of accuracy reference value that is set in advance for the received sentence.

Furthermore, with a third aspect of the present invention, the above object is achieved by providing in the first or second aspect an application program wherein the event is created due to progress of the game executed on the information terminals.

Furthermore, with a fourth aspect of the present invention, the above object is achieved by providing in any of the first to third aspects an application program wherein the information terminals are mobile terminals, the information terminals are configured to be connectable via a wireless communication channel, and configured such that, when one information terminal enters a communicable distance range allowing communication with another information terminal, the sending step or the first forwarding step or the second forwarding step can be executed.

Furthermore, with a fifth aspect of the present invention, the above object is achieved by providing a server connected via a communication channel to the plurality of information terminals on which the application program according to any of the first to fourth aspects is executed respectively, having: a storage section in which are stored definite sentences that do not change in a process of recreational information transmission carried out among the plurality of information terminals, and a control section that sends the definite sentences stored in the storage section in response to an information acquisition request from one information terminal of the plurality of information terminals.

Furthermore, with a sixth aspect of the present invention, the above object is achieved by providing in the fifth aspect a server, wherein the control section receives and stores in the storage section the information acquisition request from the one information terminal and the sentence that the one information terminal sends and, in response to the information acquisition request from a separate information terminal different from the one information terminal, sends the definite sentences and the sentence received from the one information terminal to the separate information terminal.

Furthermore, with a seventh aspect of the present invention, the above object is achieved by providing a server connected via a communication channel to the plurality of information terminals on which the application program according to any of the first to fourth aspects is executed, having: a storage section on which a plurality of fixed phrases for sentence generation are stored, and a control section that achieves a function of generating a sentence by inserting a word, which is inputted into the server or selected in relation to an event created by the server, into a fixed phrase for sentence generation selected from the plurality fixed phrases for sentence generation, a sending function of sending the generated sentence to the information terminals via the communication channel, a function of receiving via the communication channel the sentence sent due to execution of the application program in the information terminals, and a forwarding function of forwarding the received sentence to the different information terminals.

Furthermore, with an eighth aspect of the present invention, the above object is achieved by providing an information system having a server, having: a plurality of information terminals on which the application program according to any of the first to fourth aspects is executed; having a storage section connected via a communication channel to the information terminals and in which are stored definite sentences that do not change in a process of recreational information transmission carried out among the plurality of information terminals; and a control section that sends the definite sentences stored in the storage section in response to an information acquisition request from one information terminal included in the plurality of information terminals.

Furthermore, with a ninth aspect of the present invention, the above object is achieved by providing to the eighth aspect an information system wherein the control section of the server receives and stores in the storage section the information acquisition request from the one information terminal and the sentence that the one information terminal sends and, in response to the information acquisition request from a separate information terminal different from the one information terminal, sends the definite sentences and the sentence received from the one information terminal to the separate information terminal.

Furthermore, with a tenth aspect of the present invention, the above object is achieved by providing an information system provided with a plurality of information terminals on which the application program according to any of the first to fourth aspects is executed, and a server connected to the information terminals via a communication channel, wherein the server has: a storage section on which a plurality of fixed phrases for sentence generation are stored, and a control section that achieves a function of generating a sentence by inserting a word, which is inputted into the server or selected in relation to an event created by the server, into a fixed phrase for sentence generation selected from the plurality fixed phrases for sentence generation, a sending function of sending the generated sentence to the information terminals via the communication channel, a function of receiving via the communication channel the sentence sent due to execution of the application program in the information terminals, and a forwarding function of forwarding the received sentence to the different information terminals.

By using this information transmission method, uncertain information relating to a game for example is propagated successively to a game terminal from an information generating source. The content of this uncertain information is changed in the process of propagation. In this manner, when a user (player) obtains uncertain information, a desire is created to confirm its authenticity, which has an effect of making the game more interesting and captivates the player's interest in the game for longer. Furthermore, there is also an effect of stimulating a desire to play a new game when information is obtained relating to another player. Moreover, it is also possible to generate an event by propagating as uncertain information an event that is matched to the progress of the game.

By using this information transmission method, uncertain information is accumulated from nearby game terminals or the like by the player merely carrying a game terminal. This accumulation process runs in the background of the game program and presents no burden to the player. There is also no dependence on the communication ability of the player. There is also no requirement for good input ability, which is required in real time communication such as chat, and it is possible to achieve this on a general-purpose game terminal.

Furthermore, with this information transmission method, occurrences of nuisances such as spam and chain email can be prevented by limiting a range of information transmission. By using the information transmission method of the present invention, the manner in which rumors are propagated in the real world can be reproduced in a video game world executed on a game terminal.

BRIEF DESCRIPTION OF THE DRAWINGS

FIG. 2 is a block diagram illustrating a configuration of a game terminal.

FIG. 3 shows an example data structure of a sentence DB in which fixed phrases used in the uncertain information are stored.

FIG. 4 shows an example data structure of user information.

FIG. 7 shows an example data structure of an event DB in which content of events created within the game is stored.

FIG. 8 shows an example data structure of a checkpoint DB.

FIG. 9 shows an example data structure of a communication history DB.

FIG. 10 shows an example data structure of a rule variation DB in which rules relating to how to vary data entries are stored.

FIG. 11 shows an example data structure of a word candidate DB.

FIG. 18A is a flowchart describing use of a serial number to implement a loop-back prohibiting process at a time of sending and FIG. 18B is a flowchart describing use of an event flag to implement a loop-back prohibiting process at a time of sending.

FIG. 19 is a diagram for describing a specific example of the process shown in FIG. 18A.

FIG. 24A is flowchart that describes when a data entry undergoes variation based on rules stored in the rule variation DB 23, FIG. 24B is flowchart that describes when a data entry undergoes variation by varying the fixed phrase to a different fixed phrase, FIG. 24C is flowchart that describes when a data entry undergoes variation by replacing words to be used in a fixed phrase, and FIG. 24D is flowchart that describes when a data entry undergoes variation by using bold letters to replace a portion of the words to be used in a fixed phrase.

FIG. 26 shows example screens of when words are replaced.

FIG. 27 shows example screens of when a portion of a word is changed to bold letters.

FIG. 33 shows an example data structure of a software management table in which associative relations between serial numbers and game titles are stored.

FIG. 34 shows an example data structure of the user authorization DB.

FIG. 35 shows an example data structure of the relay terminal authorization DB63.

BEST MODE FOR CARRYING OUT THE INVENTION

Hereinafter, embodiments of the present invention are described with reference to the accompanying drawings. However, the technical range of the present invention is not limited by these embodiments but rather to the invention described in the claims and extends to equivalents thereof.

Figure 1:
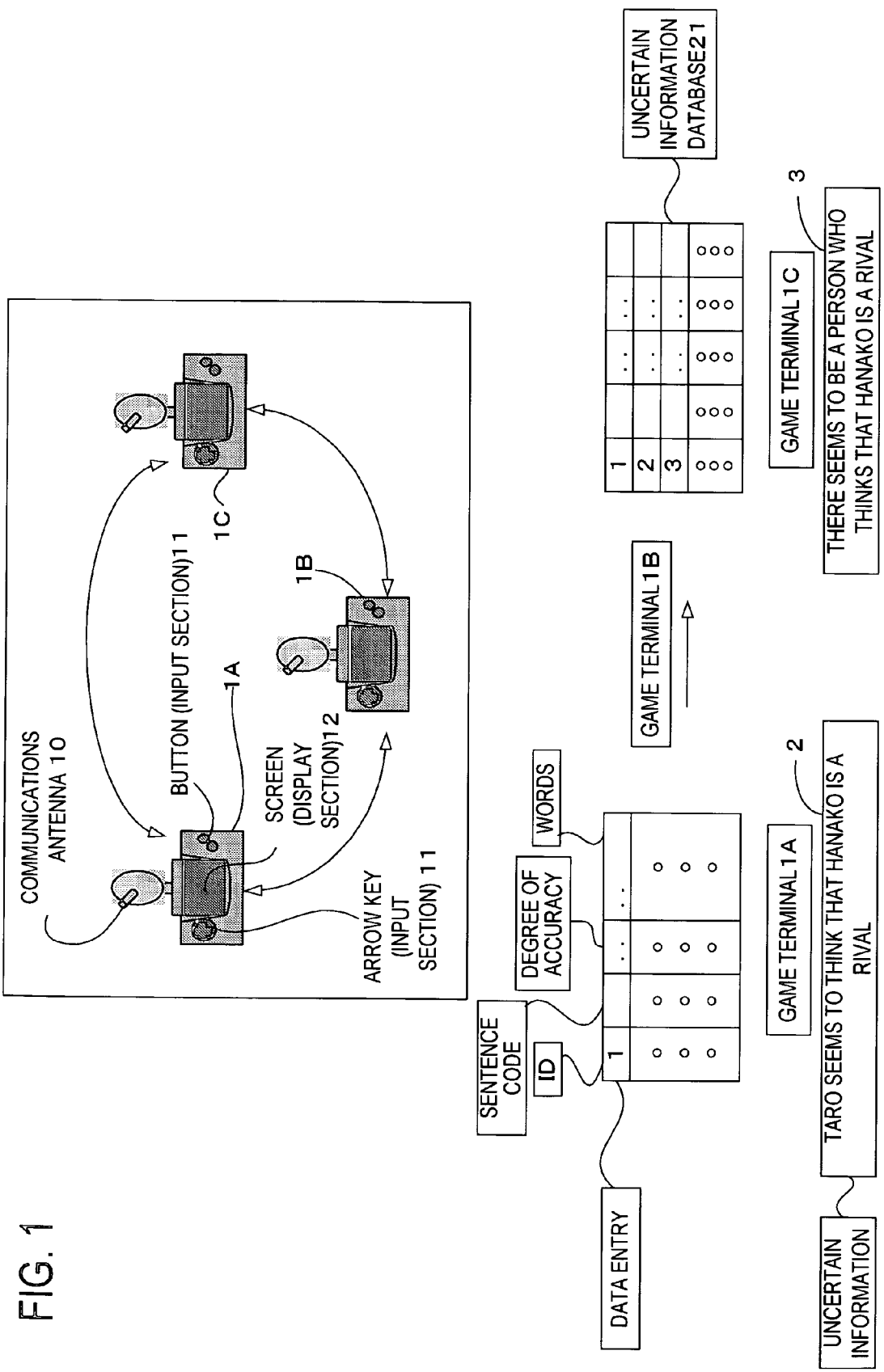
FIG. 1 shows a configuration of a first embodiment of an information transmission system in which a method of the present invention is applied.

FIG. 1 shows a configuration of a first embodiment of an information transmission system in which a method of the present invention is applied. In the first embodiment, rumors relating to the game are stored as uncertain information in game terminals 1. Players enjoy the game by carrying out communication among game terminals 1, which are provided with a wireless communication function, and play against each other exchanging uncertain information stored in the game terminals 1. Uncertain information that has been stored in the game terminals 1 is repetitively exchanged among multiple game terminals 1, thereby propagating uncertain information. The uncertain information of the present embodiment is propagated as sentences generated based on fixed phrases stored in advance in an information terminal. Various uncertain information is made by inserting words into these fixed phrases. Words to be inserted include names of players thought to be rivals among players who have previously competed and items or the like obtained by players, and are selected from words inputted to the game terminals 1 or words stored in advance in the game terminals 1.

With the game terminals 1, the terminals are controlled by running a program for executing the method of the present invention, thereby advancing the game. The game terminals 1 are achieved by information terminals such as portable game devices, mobile telephones, and PDAs (portable digital assistants) for example. In the first embodiment, the uncertain information is stored in an uncertain information database (hereafter abbreviated to "uncertain information DB") 21 provided in each of the game terminals 1.

FIG. 1 illustrates an example of a data structure of the uncertain information DB. Each line of the uncertain information DB 21 is a data entry. Uncertain information is propagated among game terminals 1 by the game terminals 1 sending and receiving these data entries. The data entries shown in FIG. 1 contain an identifier ID, a sentence code, a degree of accuracy, and word(s). An identifier is a control number for specifying a data entry. A sentence code is associated with a fixed phrase in a sentence database to be described below and specifies a fixed phrase having a blank space(s).

A word contains at least one word corresponding to a number of blanks in the fixed phrases. Degree of accuracy refers to a degree of accuracy of a sentence generated by fitting words into fixed phrases specified by the sentence code and this numerical value changes in the process of transmitting data entries. When the degree of accuracy falls below a predetermined threshold, the data entry is changed and the uncertainty of the information is increased. Changing a data entry refers to changing the sentence code or executing a process such as replacing the word being used with another word or changing it to bold letters.

The degree of accuracy has a maximum value of 100 and a minimum value of zero for example. This means that the higher the degree of accuracy is, the closer the content is to when the uncertain information was generated, and when the degree of accuracy does not meet the predetermined threshold, there is a likelihood that the content has been changed. Furthermore, the entity by which the degree of accuracy is reduced may be either an information terminal of a sending side or an information terminal of a receiving side.

For example, in the uncertain information DB of a game terminal 1A shown in FIG. 1 may be stored a sentence code of a fixed phrase having two blank spaces, "__ __ seems to think that __ is a rival," and "Taro" and "Hanako" as words corresponding to that fixed phrase. A sentence that can be made (this is uncertain information) by combining the words in the fixed phrase is "Taro seems to think that Hanako is a rival." In this manner, a sentence is completed for each data entry by combining the sentence code corresponding to the fixed phrase and words used in that fixed phrase, and this sentence is propagated as uncertain information 2.

Then, in the process in which this data entry is propagated to a game terminal 1C via the game terminal 1B, when the degree of accuracy is decreased and the degree of accuracy does not exceed the predetermined threshold, a change is made to new uncertain information 3, for example "there seems to be a person who thinks Hanako is a rival." This means that along with a change in the sentence code corresponding to a different fixed phrase "there seems to be a person who thinks __ __ is a rival" in the data entry of the uncertain information DB of the game terminal 1C, a word corresponding to one of the blank spaces has changed to "Hanako." In this manner, a sentence is completed for each data entry by combining the sentence code corresponding to the fixed phrase and words used in that fixed phrase, and when the data entry is propagated, this sentence is propagated as uncertain information and provided to a player.

The game terminal 1C checks whether or not a data entry having the same identifier as the received data entry is already stored in the uncertain information DB 21 and may be configured to store new data entries only. By doing this, there is no duplicate storing of data entries from multiple routes (in the above example of the game terminal 1C for example, a data entry directly propagated from the game terminal 1A to 1C without going through the game terminal 1B), and the amount of storage capacity used can be conserved. Furthermore, it is possible to prevent a data entry that has been received once, or a data entry of a generative source on one's own terminal from again returning to one's own game terminal 1 via another game terminal 1 and being stored in duplicate.

In this way, data entries are changed in the process of propagation to the game terminals 1 such that the content of the uncertain information becomes more dubious, or in other words, such that the uncertainty is increased. The more game terminals 1 to which propagation is carried out, the more the degree of accuracy decreases and the more uncertain the authenticity becomes with the content thereof becoming uncertain. In this way, it is possible to create a condition in which the more time that passes from the generation of uncertain information and the more game terminals 1 through which information passes, the more the authenticity becomes uncertain.

The data entries are changed in the above-described manner so that their uncertainty increases, and therefore a player cannot judge the authenticity of information merely by obtaining a single data entry. Then, the player will act in such ways as actually operating the game attempting to verify the extent of authenticity, or moving to the real world attempting to obtain information from a different game terminal 1 in order to collect different information, or searching to meet face to face with another player for conversation. In this manner, a player's interest in a game can be attracted for a long period.

FIG. 2 is a block diagram illustrating a configuration of the game terminal 1. The game terminal 1 has an input section 11, a display section 12, a transceiver section 13, a control section 14, and a storage section 20, and the control section 14 includes a game progress management section 15, a user information management section 16, and an uncertain information management section 17. In the present embodiment, the game progress management section 15, the user information management section 16, and the uncertain information management section 17 are provided in the control section 14 and achieved with a program executed by a CPU omitted from the drawings, but these may also be achieved using hardware circuitry.

The game progress management section 15 displays a game screen on the display section 12, receives commands inputted by a player via the input section 11, and carries out processing in response to those commands. For example, the game progress management section 15 displays data entries stored in the uncertain information DB on the display section 12 and also stores information indicating checkpoints that have been accomplished among various checkpoints provided in the game in a checkpoint database (checkpoint DB) 22 of the storage section 20.

Further still, the game progress management section 15 references an event database (event DB) 28 in which events to be generated in the game have been stored and if an event flag is set in the data entry of uncertain information that has been received, generates the corresponding event in the game.

The input section 11 corresponds to an arrow key or a button shown in FIG. 1 for example and the display section 12 corresponds to a screen shown in FIG. 1 for example. The input section 11 and the display section 12 function as an interface to the player.

The user information management section 16 manages the player's user information 24 stored in the storage section 20. The user information 24 is data that is exchanged between the game terminals 1 and includes a player name that specifies the player (or a character operated by that player). Furthermore, the user information management section 16 accumulates player names from among user information inputted by other game terminals 1 via the transceiver section 13 in a communication history database (communication history DB) 27. The player names stored in the communication history DB 27 are used for display on the display section 12 when setting a player thought to be a rival for example.

The uncertain information management section 17 references the checkpoint DB 22 and the user information 24 to generate uncertain information as a data entry, then stores the generated data entry in the uncertain information database (uncertain information DB) 21, and manages the uncertain information DB 21 by deleting data entry that have become unnecessary due to expiry of a valid period or the like. Upon receiving a data entry from the game terminal 1 of another party, the uncertain information management section 17 carries out a data entry variation process by referencing a sentence database (sentence DB) 25 in which fixed phrases and sentence codes are associated and stored, a word candidate database (word candidate DB) 26 in which words, sentences, vocabulary items and the like used with fixed phrases are stored, and a rule variation database (rule variation DB) 23 in which rules are stored that determine how data entry variations are carried out, and stores the data entry that has undergone variation in the uncertain information DB 21. Moreover, the uncertain information management section 17 selects and supplies to the transceiver section 13 data entries to be sent to game terminals 1 of other parties.

Through a communications antenna 10 (see FIG. 1) built into or externally attached to the game terminal 1, the transceiver section 13 has a wireless communication function that enables wireless communication with other game terminals 1, thereby sending and receiving the user information 24 and data entries stored in the uncertain information DB 21 with the game terminals 1 of other communication parties (hereinafter referred to as "other-party communication terminals"). The communications antenna 10 may also be provided as an extension device connected via an extension device connector provided in the game terminal 1 but not shown in the drawings.

When there is an other-party communication terminal capable of wireless communications, the transceiver section 13 sends the user information 24 and data entries stored in the uncertain information DB 21 to the other-party communication terminal via the control section 14. The transceiver section 13 then supplies the user information received from the other-party communication terminal to the user information management section 16 and supplies the data entries received from the other-party communication terminal to the uncertain information management section 17.

Stored in the storage section 20 are a terminal control program, which is not shown in the drawings, the uncertain information DB 21, the checkpoint DB 22, the rule variation DB 23, the user information 24, the sentence DB 25, the word candidate DB 26, the communication history DB 27, the event DB 28, and other data required for processes carried out on the game terminal 1. The storage section 20 is a storage unit such as a battery backed up RAM, a flash ROM, or a hard disk for example.

Next, a data structure of sets of data stored in the storage section 20 is described in order of the sentence DB 25, the user information 24, the uncertain information DB 21, the event DB 28, the checkpoint DB 22, the communication history DB 27, the rule variation DB 23, and the word candidate DB 26.

Sentence Database

FIG. 3 shows an example data structure of the sentence DB 25 in which fixed phrases used in the uncertain information are stored. Stored in the sentence DB 25 are fixed phrases having blank spaces, sentence codes that specific those fixed phrases, and word items required to fill the fixed phrases having blank spaces.

In FIG. 3 for example, the fixed phrase "__ __ seems to think that __ __ is a rival" corresponding to a sentence code 001 has two openings (blank spaces) within the phrase, and it is evident that the word items to be accommodated therein are a subject and a rival. This means that words used to fill the blank spaces are selectable from words stored in "subject" and "rival" word items in the word candidate DB, which is described later. Stored in the sentence DB 25 are fixed phrases such as initial fixed phrases that are selected when general uncertain information is to be generated, variation fixed phrases that are selected when data entries are to be varied in the process of propagation, checkpoint corresponding fixed phrases that are used in the uncertain information to be generated when the player reaches checkpoints set within the game, event flag corresponding fixed phrases used for events to be generated within the game. Checkpoints and events are also described later.

User Information

FIG. 4 shows an example data structure of the user information 24. User information (personal data) about the actual player of the game terminal 1 is contained in the user information 24. In regard to user information, the game progress management section 15 displays a user information input screen at the commencement of a game, then player input is prompted and initial settings are made with the inputted content and additionally, the game progress management section 15 displays an update screen, which is called out via the input section 11 during the running of the game, then player input is prompted and the user information is updated with the inputted content.

User information includes items such as a serial number, a name, sex, location, rivals, friends, and rare items. The serial number is a number that specifies a storage medium such as a ROM cartridge, CD, or DVD on which the game program is stored.

If the game program is not supplied by a storage medium but for example is directly downloaded to the game terminal 1 from a server, the serial number may be a unique device number of the game terminal 1. Alternatively, if the game program is coded so as to possess a different identifying number for each program, the identifying number can be used in the serial number. By using the serial number as a part of the data entry ID, the uncertain information is uniquely specified and it is possible to avoid duplicate accumulation of the same uncertain information in the uncertain information DB.

"Name" refers to a name that specifies a player who plays the game. This name may be a person's real name or may be a nickname used for playing the game. Male or female is selected for "sex." If the player does not want to select either of these, it also can be set as secret. In this case, "secret" is stored under "sex."

For "location," a region in which the player usually lives is set. When the location is set, it is possible to obtain uncertain information limited to that region. If the player does not want to set a location, it can be set as secret. In this case, "no setting" is stored under "location."

The names of other players are stored under "rival" and "friend" respectively. At the commencement of the game there is usually no information relating to other players and "no setting" is stored under "rival" and "friend" respectively. Under "rare items" are stored the names of items (rare items) categorized among items the player has obtained in the game as items that appear infrequently or items that are difficult to obtain.

When a valid value is stored under "rival," "friend," or "rare item," uncertain information related to that is generated. For example, in competitive play there can be special effects such as obtaining bonus points or being able to obtain another player's items when a player specified as a "rival" is beaten. Special effects are available for a player specified as a "friend" involving being able to receive cooperative action in that player's role in the game or in competitive play. Accordingly, when this item is set, the player can experience developments different than playing the game alone and therefore the fun of the game is accelerated and interest in the game can be held longer. Furthermore, when uncertain information relating to these items is propagated between the game terminals 1, users move wanting to play against that player and uncertain information becomes disseminated more easily.

Furthermore, a player who desires a rare item will obtain that by winning against a player who has that item or going to a location within the game where that player obtained the item, or attempting to converse with that player. Accordingly, such behaviors are stimulated inside and outside the game by propagating uncertain information relating to rare items between the game terminals 1, which results in interest in the game being held longer.

Uncertain Information Database

Figures 5A, 5B:
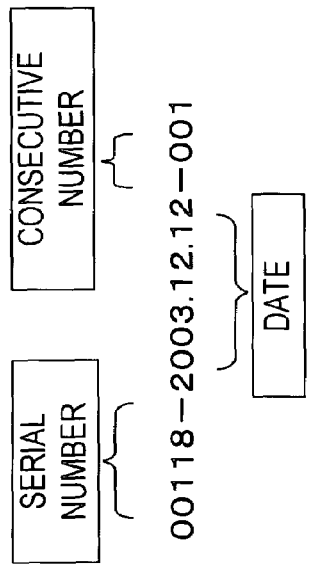
FIG. 5A shows an example data structure of data entries stored in an uncertain information DB21 and FIG. 5B shows an example data structure of an ID.

FIG. 5A shows an example data structure of data entries stored in the uncertain information DB 21. In addition to the ID, sentence code, degree of accuracy, and words described in FIG. 1, the data entries shown in FIG. 5A include a sending limit number, a remaining number of times of sending, a receiving limit number, a type, an event flag, a valid period limit, and a region. Other than the ID, sentence code, degree of accuracy, and words, these items are additional data items for making the game more enjoyable and facilitating management.

FIG. 5B shows an example of a data structure of the ID, which is a control number for specifying a data entry. In FIG. 5B, as an example, the serial number (see FIG. 4) contained in the user information 24, the date, and a consecutive number appended when a data entry is generated by the uncertain information management section 17 are linked by hyphens. This enables the uncertain information management section 17 to generate an ID by using the serial number obtained from the user information 24 and the date obtained from a clock (not shown in FIG. 2) provided in the game terminal 1, and adding to this a consecutive number indicating that the uncertain information is the n-th set generated that day.

When the uncertain information management section 17 receives a data entry from another game terminal 1 and there is no data entry with the same ID, the received data entry is stored in the uncertain information DB 21. By doing this, data entries that are the same are not stored in duplicate. That is, a phenomenon can be prevented in which an entry that has been received once, or a data entry of a generative source on one's own terminal is looped back via another game terminal. This prevents situations in which players are confused by data entries circulating endlessly between the same game terminals and receiving data entries that become uncertain each time upon reception.

Returning to FIG. 5A, the "sentence code" is a sentence code that specifies a fixed phrase stored in the sentence DB 25 of FIG. 3. "Words" refers to words and vocabulary items and the like for filling the blank spaces of the fixed phrase specified by the sentence code.

Uncertain information is provided to the player by combining the fixed phrase specified by the sentence code with word(s). For example, if the sentence code is "001" and there is a data entry in which "Taro" and "Hanako" are stored are words, the fixed phrase corresponding to the sentence code 001 in FIG. 3 is referenced and a sentence "Taro seems to think that Hanako is a rival" is generated and this is provided to the player as uncertain information.

The "degree of accuracy" refers to a numerical value indicated the accuracy of the uncertain information. This numerical value is set at 100 as an initial value and decreases in accordance with propagation of uncertain information between the game terminals 1. Then, when the degree of accuracy does not meet a predetermined threshold value, the data entry is changed.

Due to this degree of accuracy there is an effect in which content more similar to that when uncertain information was generated is propagated to game terminals 1 that are temporally or spatially close to the generative source of the uncertain information, and content in which the uncertainty of that content has been increased is propagated to game terminals 1 that are temporally or spatially distant.

The "sending limit number" indicates a number of times a data entry can be sent to other game terminals 1. The "remaining number of times of sending" is set to the "sending limit number" as an initial value and is reduced by one each time the data entry is sent to another game terminal 1. Information having a "remaining number of times of sending" that is zero can no longer be sent.

The "receiving limit number" is a numerical value indicating a number of times reception can be carried out. When the game terminal 1 stores a received data entry in the uncertain information DB, this numerical value is reduced by one. Then, information having a receiving limit number that is zero can no longer be received. As long as the "receiving limit number" and the "sending limit number" are not particularly specified, these can be established as a predetermined value, for example three times each. When this is specified by input, that value is used. The "sending limit number," the "remaining number of times of sending," and the "receiving limit number" function as information of the number of times of transfer for preventing data entries from being disseminated endlessly. This condition is described with reference to the following drawing.

Figure 6:
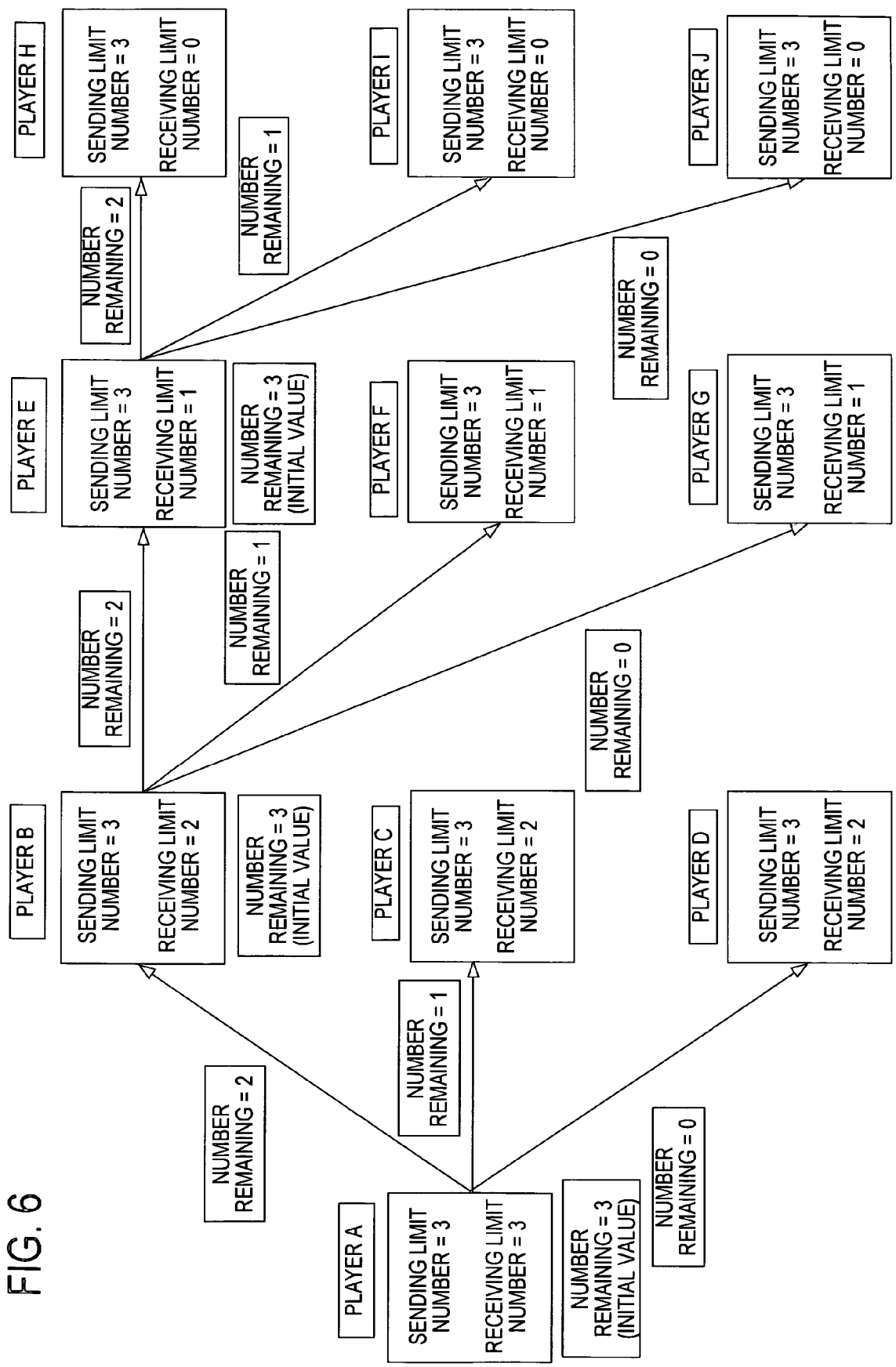
FIG. 6 describes how the dissemination of information is limited by a sending limit number, a receiving limit number, and a remaining number of times to be sent.

FIG. 6 describes how the dissemination of information is limited by the sending limit number, the receiving limit number, and the remaining number of times of sending. Suppose that there is a data entry in which the sending limit number is set to three and the receiving limit number is set to three. Due to the sending limit number, this data entry can be sent to three game terminals 1 from the game terminal 1 of a player A, and is sent to the game terminals 1 of players B, C, and D respectively. Each time the data entry is sent, the remaining number of times of sending, which is stored in the game terminal 1 of the player A, is reduced by one and when the data entry is sent to the game terminal 1 of the player D, the remaining number of times of sending becomes zero and therefore this data entry will no longer be sent from the game terminal 1 of the player A to any other game terminal 1.

When the data entry sent from the player A is stored in the game terminal 1 of the player B, the receiving limit number is updated to a value reduced by one. The game terminal 1 of the player B who has received the data entry from the player A can also send this data entry to another three game terminals 1. In this way, the data entry is propagated from the game terminal of the player B to the game terminals 1 of the players E, F, and G.

In the same manner, when the data entry sent from the player B is stored in the game terminal 1 of the player E, the receiving limit number is updated to a value reduced by one. The data entry is sent from the game terminal 1 of the player E to game terminals 1 of players H, I, and J, and the receiving limit number is updated to a value reduced by one. When the data entry is stored in the game terminals 1 of the players H, I, and J, the receiving limit number becomes zero. Accordingly, propagation of this data entry is stopped here and this information is not spread any further. The same can be said in regard to information propagated to the player C and the player D.

Information in which the sending limit number is three times and the receiving limit number is three times is propagated to 27 information terminals. To generalize this, propagation is performed to an x to the power of y (x: sending limit number, y: receiving limit number) number of information terminals. This enables the number of devices to which information is spread to be restricted in advance. In other words, nuisances equivalent to spam email and chain email can be prevented.

Returning to FIG. 5A, description of the data items contained in data entries of the uncertain information DB 21 will continue. "Type" refers to information indicating a type of data entry. For example, "0" refers to data entries relating to rivals, "1" refers to data entries relating to friends, "2" refers to data entries relating to the progress status of the game, and "3" refers to data entries that are not changed by propagation.

Data entries relating to rivals are generated when a particular player sets another player as a rival in the game terminal. Data entries relating to friends are generated when a particular player sets another player as a friend in the game terminal.

Data entries relating to the progress status of the game are generated by the player reaching a checkpoint that is set in the game. Data entries that are not changed by propagation are known as demarcation information, including for example public information announced by a game vendor and information that works with the program and gives advance notice that an event is to be generated.

Accordingly, in the above-described example, if the "type" is other than three, the data entry changes in the process of propagation and when the "type" is three, the data entry does not change. In the first embodiment, in order to prevent false information from being generated as uncertain information by the player, information generated at the game terminal 1 was all uncertain information other than "type" three. A case in which data entries are "type" three is described in a second embodiment. It should be noted that the types are not limited to four and are freely settable by the executer of the information transmission method.

By using "types" in this way, it is possible to propagate to players public information such as advance notice of game tournaments and promotional information. Additionally, it is guaranteed that the content of public information will not be altered. For example, advertisers can be invited and by propagating advertisements to the game terminals 1 the game vendor can use the advertising charges as a new source of profit.

"Event flags" are flag information used in generating events within the game by working with the game program, and this means that if a flag has a value of one there is an event setting and if this is zero, there is no event setting. Events that are produced corresponding to the event flags are coded into the program in advance and if an event flag is set in the received information, the corresponding event is produced within the game.

Event Database

FIG. 7 shows an example data structure of the event DB 28 in which the content of events produced within the game in response to received data entries is stored. As shown in FIG. 7, in this database, the sentence code contained in the received data entry, the content of the event corresponding to that sentence code, and an "on/off flag," which is flag information indicating whether or not that event is active, are associated and stored. By searching for the sentence code shown in FIG. 7 in the sentence DB shown in FIG. 3, uncertain information can be specified for providing the content of an event to the player.

For example, in the final data entry in FIG. 5A, the event flag is one, which makes evident that there is a data entry containing an event of some kind. Now, the value of this sentence code is 1001. The game progress management section 15 searches the sentence DB 25 of FIG. 3 and the event DB 28 of FIG. 7 using the value of the sentence code contained in the received data entry, and provides uncertain information to the player via the display section 12 that "it seems you can receive a rare item if you have five consecutive wins in the game this month."

After this is displayed on the display section 12 and the player has confirmed the data entry, the game progress management section 15 produces an event "if you have five consecutive wins against other players within the month this information is obtained, you will be given a gold medal rare item," then changes the on/off flag of FIG. 7 to ON.

Returning to FIG. 5A, the "valid period limit" is information that indicates a period or date to which a data entry is valid. A data entry in which a valid period limit has been set becomes invalid when a fixed period from production is exceeded. An invalid data entry can no longer be sent and therefore this has an effect of preventing excessive dissemination of data entries. Furthermore, the player's interest in the game may be attracted by propagating as certain information data entries in which a valid period limit has been set such as when having a time limited event as a promotion to get a greater number of players to participate in the game.

"Region" refers to information indicating a dissemination range of a data entry. For example, this may be in units of prefectures within a nation. The region may be used in conjunction with the "location" (see FIG. 4) contained in the user information. For example, if Tokyo is selected as the region, it is possible to propagate information only to players whose "location" is consistent with metropolitan Tokyo. In this way it is possible to generate data entries to be disseminated within a specified region and data entries to be spread on a nation scale.

Checkpoint Database

FIG. 8 shows an example data structure of the checkpoint DB 22. Stored and mutually associated in the checkpoint DB are "checkpoint codes" that specify checkpoints, an "on/off flag," "sentence codes," "words," and "conditions." If the player meets a condition listed under "condition" in the game, the on/off flag, which is flag information indicating whether or not the player has reached that checkpoint, is switched to "ON."

By doing this, uncertain information relating to the checkpoint that has been reached is generated and the sentence code and words are referenced at this time. It should be noted that among items included under "words," other than the "subjects," a corresponding value for each item is linked and stored using an equal symbol, and that value is used. The name of the player (the "name" under user information in FIG. 4) that plays the game terminal 1 is used for the "subject."

For example, when the checkpoint in FIG. 8 is 001, the on/off flag goes "ON" due to the player (here this is "Taro") defeating a wolf and since the sentence code is 501 (see FIG. 3) and the words are "subject, wolf," a data entry of uncertain information is generated saying "It seems Taro has used a disguise and deceived the wolf." In this way, each time the player meets a "condition," the checkpoint DB 22 is updated and uncertain information is generated.

Communication History Database

FIG. 9 shows an example data structure of the communication history DB 27. Stored in the communication history DB 27 are the names of players ("name" in FIG. 4) extracted from user information sent from other game terminals 1 with which the game terminal 1 has had communications in the past and the date and time these communications were conducted. The date and time of communications are recorded and, when there is no space in the storage capacity, deleted starting from older data.

Rule Variation Database

FIG. 10 shows an example data structure of the rule variation DB in which rules relating to how to vary data entries are stored. Stored in the rule variation DB 23 of FIG. 10 for each sentence code (received sentence code) contained in received data entries are divisions of the "degree of accuracy," sentence codes ("post-variation sentence codes") of when the degree of accuracy is included in that division, and "word items" used in the fixed phrases corresponding to the "post-variation sentence codes." The "degree of accuracy" shown in FIG. 10 is a degree of accuracy reference value that is set in advance for each fixed phrase and determines how a data entry is varied in response to the division of degree of accuracy of the received data entry.

In FIG. 10, in a case of the received sentence code being 003 for example, when the degree of accuracy is greater than 60 but less than 80, the sentence code is changed to 102 and changes to a new data entry in which, among the word items that have been used in the received data entry, "location" and "item" are carried on. Specifically, given that the subject (=player name) is "Taro," the location is "Ogre Island," and the item is a "scroll," the uncertain information prior to variation, which is "Taro seems to have obtained a scroll at Ogre Island" since the sentence code is 003, changes after variation to "there seems to be a person who has obtained a scroll at Ogre Island" since the sentence code is 102, such that it becomes unclear who has done the obtaining.

Further still, when the degree of accuracy is below 60, the sentence code becomes 103 and it is "item" of the word items used in the received data entry that is carried on such that the phrase changes to "it seems that somebody obtained a scroll" and who and where this was obtained becomes unclear. In this manner, the data entries continue to be changed so that the uncertainty in the uncertain information is increased further.

Word Candidate Database

FIG. 11 shows an example data structure of the word candidate DB 26 that is used when varying the data entries with a method different from that of FIG. 10. In FIG. 11, there are multiple candidates (post-replacement words) associated for each "word item" and these candidates are replaceable for the words of that item in the data entries. Here "number" is an identifying number for specifying the post-replacement word when a word item has been specified.

Among the "word items" of FIG. 11, items other than the items corresponding to "subjects and rivals" are stored in advance in the word candidate DB. "Subjects and rivals" are the names of other parties for communication stored in the communication history DB 27 shown in FIG. 9. That is, when communication is carried out with another game terminal 1, the name of the other party is stored in the communication history DB 27 and also the "subjects and rivals" column of the word candidate DB 26.

The word candidate DB 26 of FIG. 11 is referenced when varying a data entry by replacing word(s) while leaving the sentence code the same. For example, suppose the sentence code is 001 and a data entry in which the subject is "Taro" and the rival is "Hanako" is stored in the uncertain information DB 21 as words corresponding to the fixed phrase of that sentence code. When the degree of accuracy no longer meets the predetermined threshold value, the uncertain information management section 17 searches for the sentence code of the received data entry in the sentence DB 25 shown in FIG. 3 and obtains the word items that are being used.

Here, it is evident that "subject" and "rival" are used in the fixed phrase of the sentence code 001. Next, the uncertain information management section 17 selects items varied from these items. The items to be varied may be singular or multiple. For example, when varying only the "subject," a "word item" of the word candidate DB of FIG. 5 is searched using "subject" and the uncertain information management section 17 selects a single word from the multiple corresponding "post-replacement words" and carries out replacement.

In this example, when "Daisuke" (number 003) is selected from the four entries of "subjects and rivals" in the word candidate DB of FIG. 11, the post-replacement data entry has the same sentence code but the words change from Taro and Hanako to Taro and Daisuke, such that the uncertain information is changed to "Taro seems to think that Daisuke is a rival."

Next, an action of the game terminal according to the first embodiment is described based on the above-described structure of the game terminal.

Figure 12:
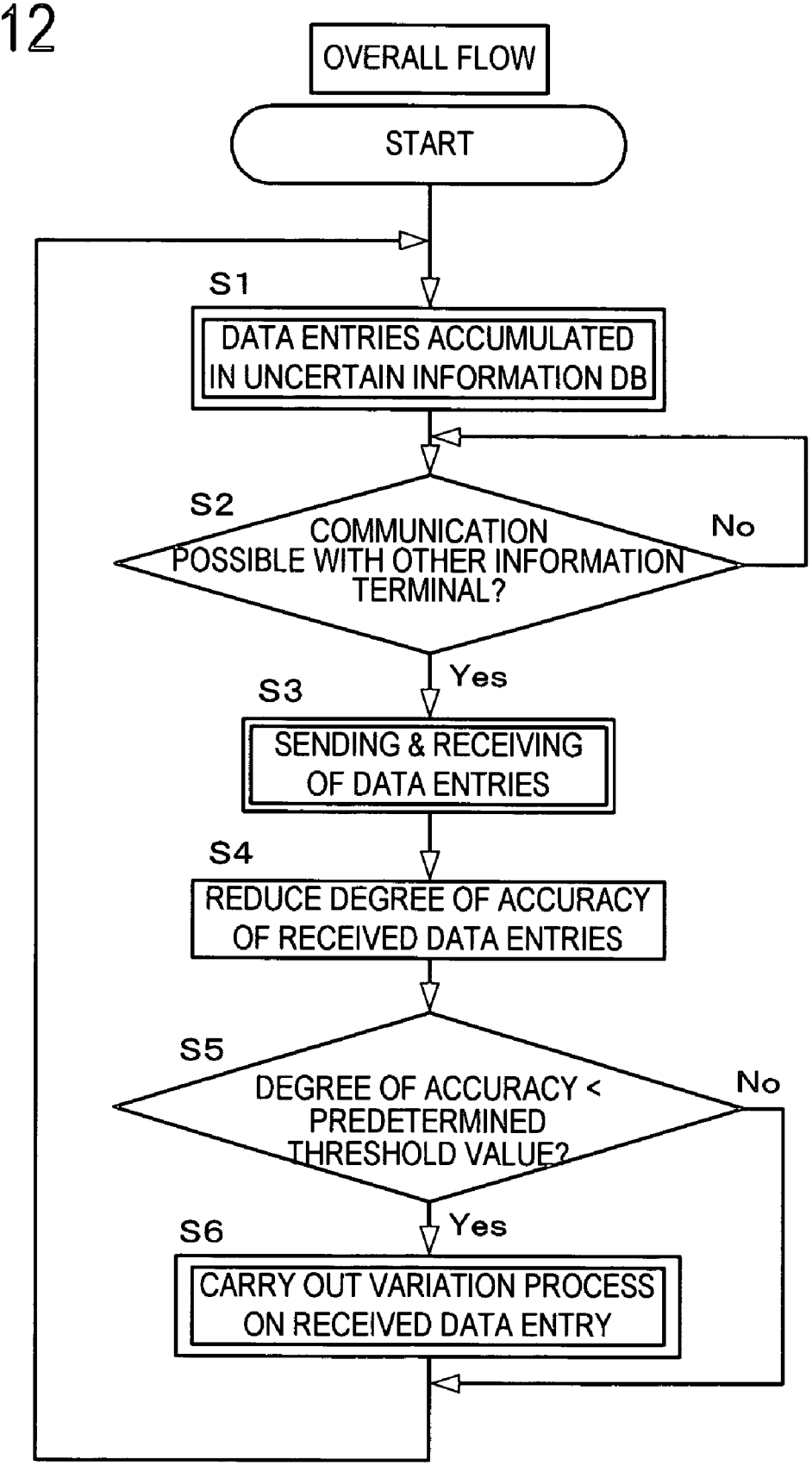
FIG. 12 is a flowchart describing an action of the game terminal according to a first embodiment.

FIG. 12 is a flowchart describing the action of the game terminal according to the first embodiment. In the present embodiment, when a program that enables the control section 14 to function as the game progress management section 15, the user information management section 16, and the uncertain information management section 17 is installed on the game terminal, the checkpoint DB 22, the rule variation DB 23, the sentence DB 25, the word candidate DB 26, and the event DB to the game terminal 1. The word candidate DB 26 that is copied at the time of installation is initial data recorded within that program, and new data (such as the names of players with whom uncertain information has been exchanged, and locations visited within the game) is added in the course of game progress.

First, the uncertain information management section 17 accumulates (S1) data entries in the uncertain information DB 21 to be propagated as uncertain information. There are two types of data entry accumulation, these being when uncertain information generated in that game terminal is stored and when data entries received from other game terminals are stored. The process of step S1 is interrupted when uncertain information is generated and when data entries are received, and recommences with processing when accumulation of the data entry is finished. Furthermore, there are multiple types of processes in which uncertain information is generated and these are described in detail later using FIG. 13.

Next, the uncertain information management section 17 determines (S2) whether or not another game terminal is present capable of communication with the game terminal via the transceiver section 13. If there is no game terminal capable of communication (no at S2), a return is made to step S1 and the game terminal stands by for a game terminal capable of communication to move into a communication range.

If there is a game terminal (other-party communication terminal) capable of communication with this terminal (yes at S2), the uncertain information management section 17 outputs the user information 24 of the terminal and the data entries in the uncertain information DB 21 to the transceiver section 13 and the transceiver section 13 sends (S3) these to the other-party communication terminal. Rather than outputting all the data entries, this may be limited by number of data sets or data size.

Furthermore, the transceiver section 13 receives the user information of the other-party communication terminal and outputs this to the user information management section 16, and the user information management section 16 stores the "name" (see FIG. 4) of the player contained in the user information of the other-party communication terminal in the communication history DB 27 and the "subject and rival" column of the word candidate DB 26. Furthermore, the transceiver section 13 receives data entries from the other-party communication terminal and outputs this to the uncertain information management section 17 (similarly S3).

Even when there are multiple game terminals within a communicable range of a particular specified game terminal, the sending and receiving processes are carried out for a single terminal among these. After one-to-one sending and receiving processes are completed, sending and receiving processes commence between another game terminal within the communicable range and the specified game terminal. Accordingly, when the one-to-one sending and receiving processes are finished, if the game terminal moves and there is no longer any other game terminal within the communicable range, the sending and receiving processes are finished.

The uncertain information management section 17 updates (S4) the degree of accuracy of the received data entry to a value reduced by a predetermined number. The degree of accuracy (predetermined number) for reduction at one time is a value determined in advance (for example, the degree of accuracy may be reduced by 20 each time), but it is also possible to set this as a different value for each data entry or a different value for each game terminal. For example, when reducing by a different value for each data entry, the data structure of the uncertain information DB shown in FIG. 5A will include a "predetermined number" as a further data item not shown in the drawing, and for each received data entry the game terminal 1 will be able to reduce the degree of accuracy by the value stored in "predetermined number." Furthermore, by storing the predetermined number in advance in the storage section 20 of the game terminal 1 and having the game terminal 1 reduce the degree of accuracy of received data entries by the predetermined number stored in the storage section 20, the predetermined number can be varied for each game terminal.

Then, the uncertain information management section 17 compares the degree of accuracy updated at step S4 with the predetermined threshold value and if the degree of accuracy is below the predetermined threshold value (yes at S5), carries out a variation process (S6) on the received data entry. When step S6 is finished, the procedure proceeds to step S1 and the uncertain information management section 17 stores in the uncertain information DB the data entry that has undergone the variation process. At step S5, if the degree of accuracy is above the predetermined threshold value (no at S5), the procedure proceeds to step S1, and the uncertain information management section 17 stores the received data entry as it is in the uncertain information DB.

There are multiple types of variation processes available for the data entries received at step S6 and these will be described in detail later using FIG. 24. Also, the manner of how to set the predetermined threshold value at step S6 changes in response to the variation process of the data entry, and therefore this too will be described using FIG. 24.

Next, an example action of the game terminal 1 is described concerning when uncertain information is generated as data entries and accumulated in the uncertain information DB 21. This is included in step S1 of FIG. 12.

Figure 13A:
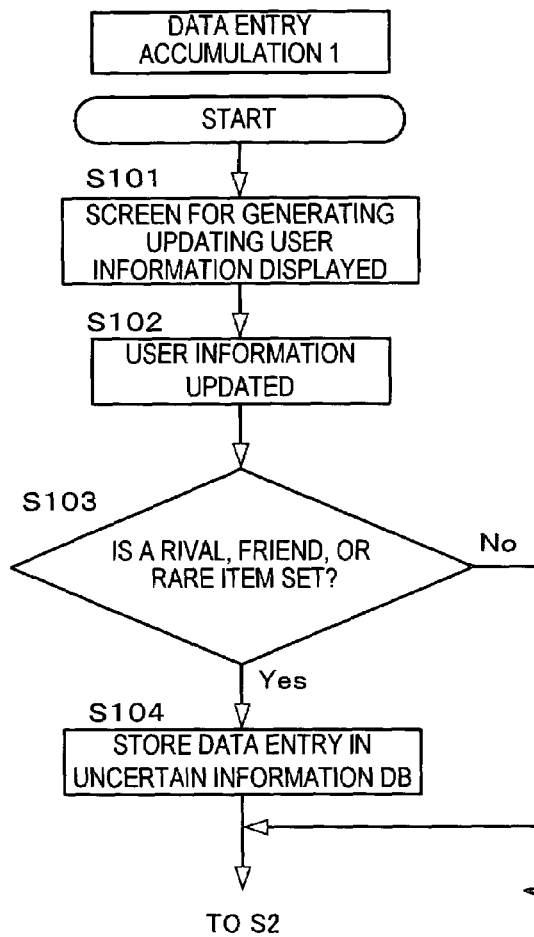
FIG. 13A is a flowchart that describes when uncertain information is generated as a data entry accompanying the generation and updating of user information.

FIG. 13A is a flowchart that describes when uncertain information is generated as a data entry accompanying the generation and updating of user information. The game progress management section 15 displays (S101) on the display section 12 a screen for generating and updating user information. On this screen, values can be inputted relating to data items of the user information (see FIG. 4). Then, the inputted values are stored (S102) as user information 24 shown in FIG. 4 in the storage section 20.

The uncertain information management section 17 periodically monitors updates of the user information 24 and determines (S103) whether "rivals," "friends," and "rare items" of the user information 24 data items have been set. If the updates of the user information 24 do not involve these three items (no at S103), the procedure proceeds to step S2 of FIG. 12.

If the updates of the user information 24 do] involve any of these three items, the uncertain information management section 17 generates a data entry and stores this in the uncertain information DB 21 (S104). The uncertain information management section 17 searches the "word items" of the sentence DB 25 of FIG. 3 using the data items that have been set at step S103 as a key and selects a single "sentence code" of a matching entry. If a rival has been set, the uncertain information management section 17 searches "rivals," if a friend has been set it searches "friends," and if a rare item had been set, it searches "items," then selects an item that matches these items or that is grouped with the subject.

A reason for including subject groupings is that subjects can be used freely since player names can be obtained by checking user information. That is, the word items of FIG. 3 are selected from items in "rivals," "friends," "items," "subject, rival," "subject, friend," and "subject, item." In this manner, the sentence code is decided.

The value inputted at step S1 is used as a "word." The degree of accuracy is set to 100 as an initial value. The "sending limit number" and the "receiving limit number" are not particularly specified, and therefore predetermined initial values (for example, three times each) are set. The "sending limit number" is set as an initial value the same value as the "remaining number of times of sending." Here, the "type" is set to zero indicating uncertain information.

The "event flag" is set to one when the selected sentence code is included in the event DB of FIG. 7 and to zero when this is not the case. Here the "valid period limit" and the "region" are set to "no setting." The "ID" is generated based on the serial number of the user information, the date, and the uncertain information generated on that day. In this manner, a single data entry is generated and stored in the uncertain information DB 21.

Figure 14:
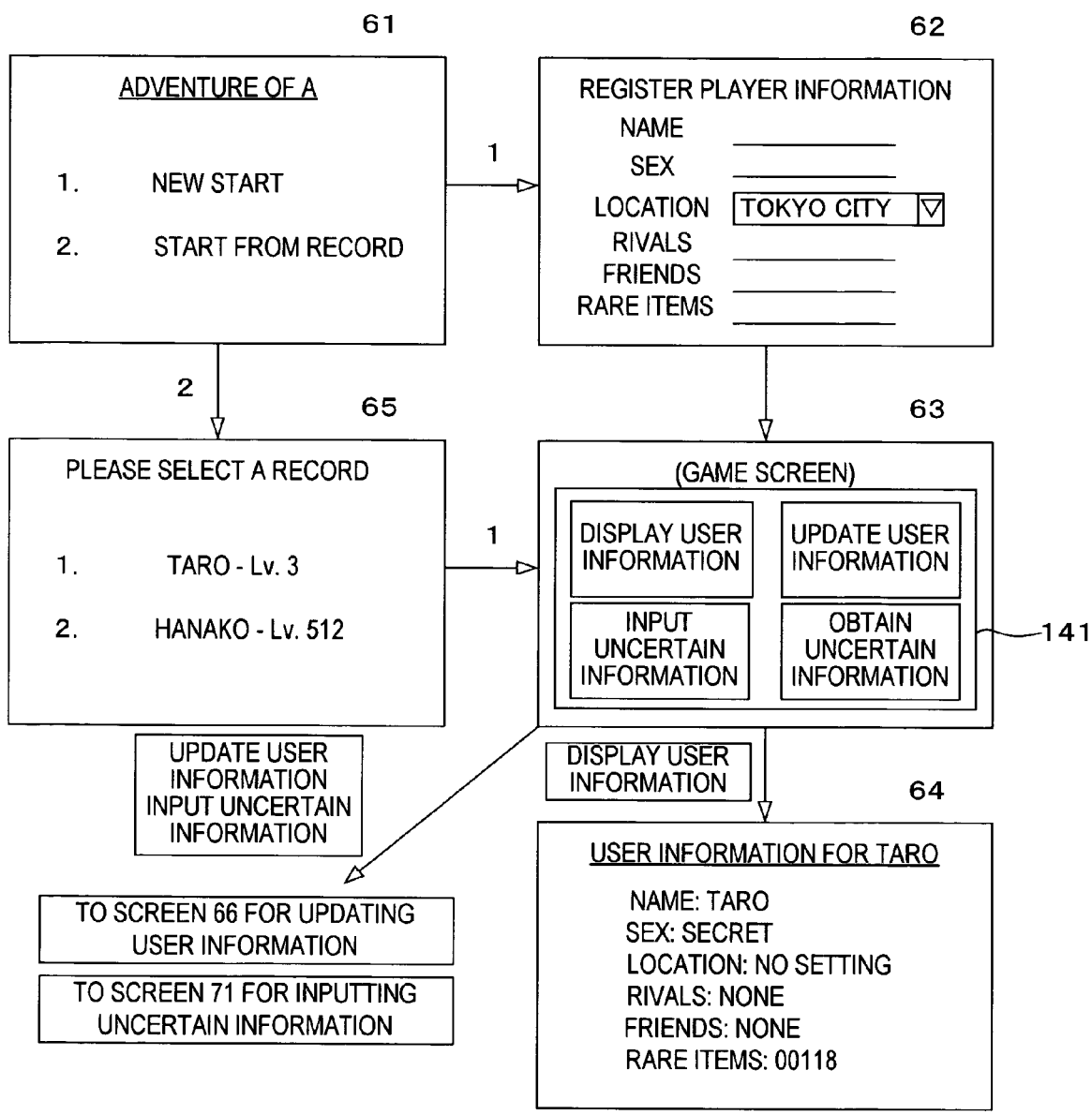
FIG. 14 shows example screens of step S101 of FIG. 13A.

FIG. 14 shows example screens of step S101 of FIG. 13A. That is, display content controlled by the game progress management section 15 is portrayed when the user information 24 is generated and updated. In FIG. 14, when the game terminal 1 is powered up, first a title and menu are displayed (screen 61). Here, this is an RPG (role playing game" called "Adventure of A." When starting from the beginning, menu item 1 (new start) is selected, and when restarting from a midway point, menu item 2 (start from record) is selected.

When the menu item 1 is selected, a screen is displayed (screen 62) for newly generating user information. Inputted here are a name for the character operated by the player, the sex of the character operated by the player, the state (location) in which the player lives, rival information, friend information, and rare items that have been obtained. Only the input of a "name" is necessary.

Then, when input is completed, the game commences (screen 63). When the menu item 2 is selected at the screen 61, names that have already been registered for that program are displayed and when the player selects one of those names the game recommences (screen 65) from a point at which play had been stopped by the selected name. A menu 141 that is called up within the game by operation of the input section 11 during the game is displayed in the screen 63, and the current user information 24 is displayed (screen 64) by selecting the item "display user information."

Opportunities for exchanging uncertain information with other game terminals 1 increase as the time the game is played increases and it becomes easier to obtain information of other players and perform settings for rivals and friends. Moreover, as the game itself progresses, opportunities for obtaining rare items increase and it becomes easier to perform settings for rare items. In such cases, the menu 141 in the game displayed on the screen 63 is called up and the user information 24 can be updated. Then, based on this update, uncertain information is generated as described with FIG. 13A.

Figure 15:
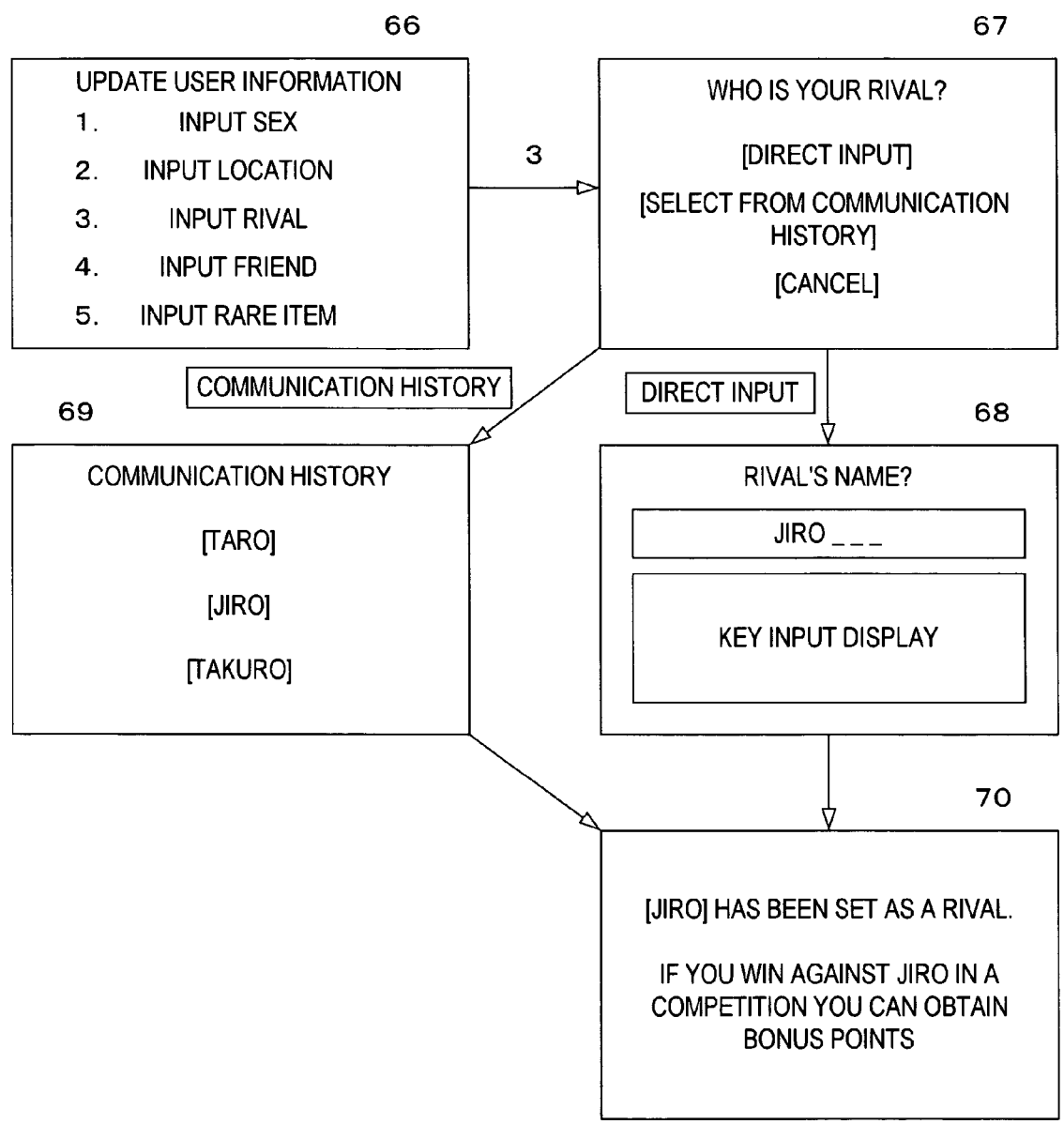
FIG. 15 shows example screens displayed when the item "update uncertain information" is selected at the screen 63 of FIG. 14.

FIG. 15 shows example screens displayed when the item "update uncertain information" is selected at the screen 63 of FIG. 14. First, a menu is displayed (screen 66) in which items desired to be updated can be selected. For example, when setting a rival, item 3 in the menu is selected and the screen changes to a rival input screen (screen 67). When "direct input" is selected, a screen 69 is displayed and the name of a rival player can be inputted directly.

When "select from communication history" is selected, a screen 68 is displayed and names of other communication parties stored in the communication history DB 27 are displayed in a list from which a rival can be selected. When the selection of a rival is completed at the screen 68 or screen 69, the completion of the rival setting is displayed (screen 70).

Figure 13B:
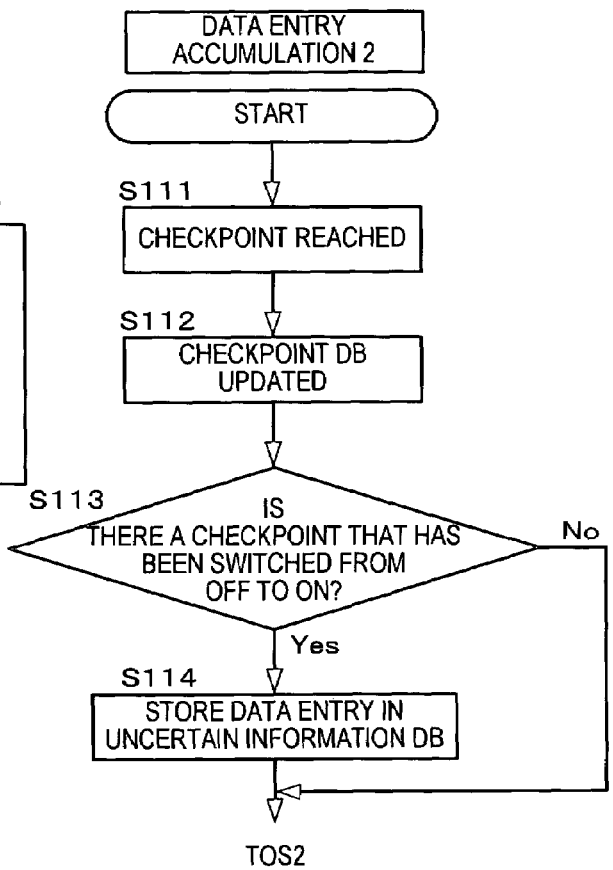
FIG. 13B is a flowchart that describes when uncertain information is generated as a data entry in response to the player reaching a checkpoint accompanying progress of the game.

Description is continued returning to FIG. 13. FIG. 13B is a flowchart that describes when uncertain information is generated as a data entry in response to the player reaching a checkpoint accompanying progress of the game.

The player has reached a checkpoint (S111) when the player meets a condition stored in the checkpoint DB accompanying progress of the game, and the game progress management section 15 sets to "ON" (S112) the on/off flag of the corresponding checkpoint in the checkpoint DB 22 (see FIG. 8).

The uncertain information management section 17 periodically monitors for updates in the checkpoint DB 22 and determines (S113) whether or not an on/off flag has been switched "ON". If an update of the checkpoint DB 22 is not an on/off flag update (no at S113), for example in cases such as when a new checkpoint has been added or an item such as a sentence code has been altered, the procedure proceeds to step S2 of FIG. 12.

If there is an on/off flag that has been switched "ON" due to an update of the checkpoint DB, the uncertain information management section 17 generates a data entry and stores this in the uncertain information DB (S114). The uncertain information management section 17 sets the "sentence code" and "words" of the checkpoint code switched "ON" at step S3 to the "sentence code" and "words" of the data entry. When a "subject" is included in the "words," the player "name" (see FIG. 4) obtained from the user information is stored. Other items here are the same as in the case of FIG. 13A and description is omitted. In this manner, a single data entry is generated and stored in the uncertain information DB 21.

Figure 13C:
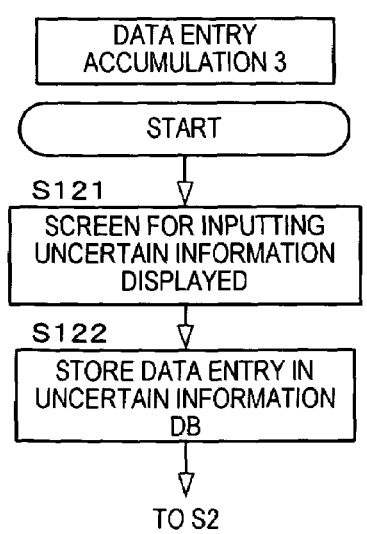
FIG. 13C is a flowchart that describes when a data entry of uncertain information is generated by the player directly inputting a value for the various items of data entry.

FIG. 13C is a flowchart that describes when a data entry of uncertain information is generated by the player directly inputting a value for the various items of data entry. The game progress management section 15 displays (S121) on the display section 12 a screen for inputting user information. On this screen, values can be inputted relating to data items of the data entries. Then, the inputted value is supplied to the uncertain information management section 17 and the uncertain information management section 17 stores this as a data entry in the uncertain information DB 21 (S122).

Figure 16:
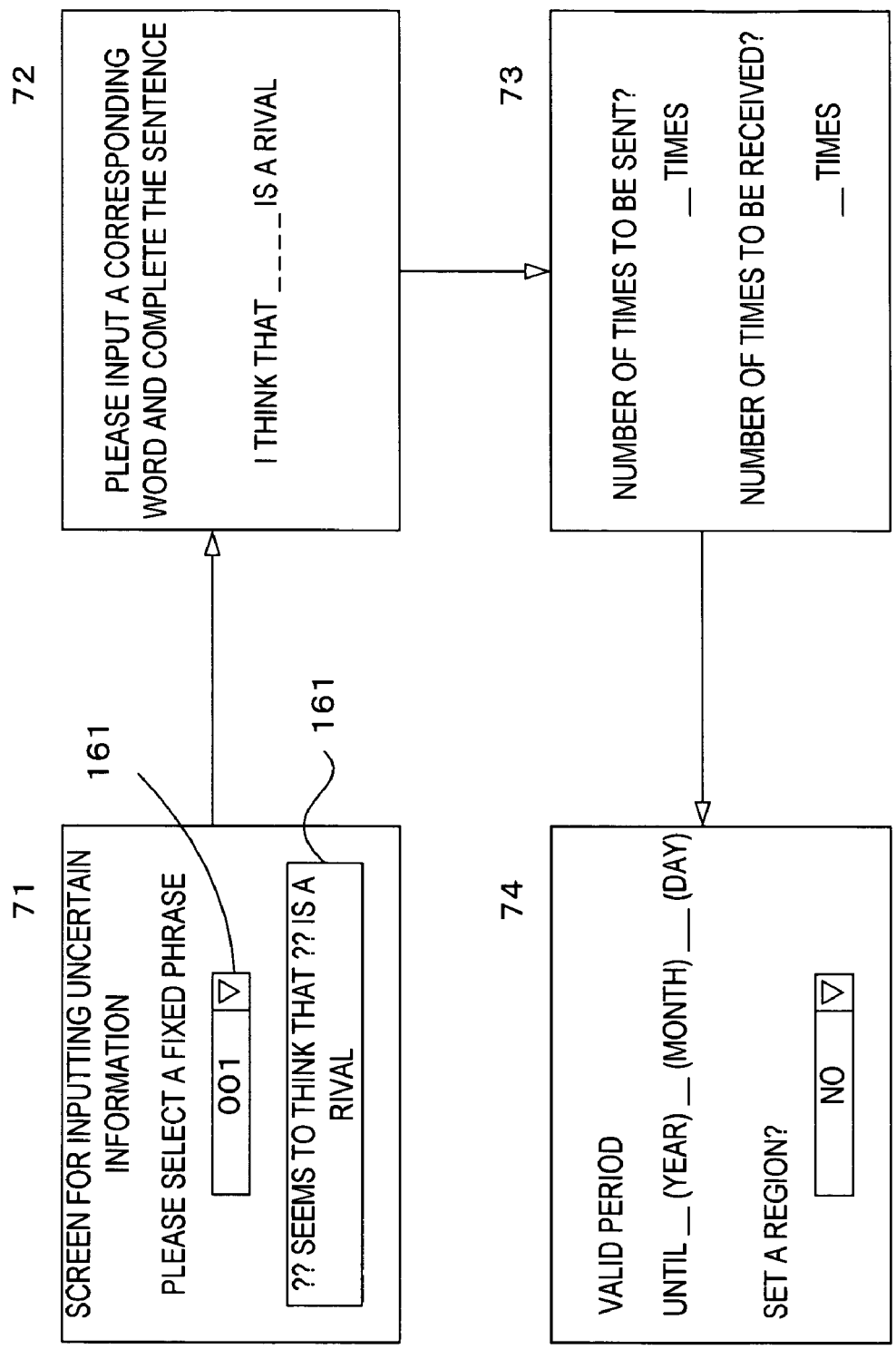
FIG. 16 shows example screens of step S1 of FIG. 13C.

FIG. 16 shows example screens of step S1 of FIG. 13C. That is, display content controlled by the game progress management section 15 is portrayed when uncertain information is inputted by the user. In FIG. 16, first a screen (screen 71) for inputting uncertain information is displayed. This is a screen displayed when the item "input uncertain information" is selected at the screen 63 of FIG. 14.

In the screen 71, a screen that enables the player to input a selection of fixed phrases is displayed and when the sentence code displayed in a pull-down menu 161 is changed, the fixed phrase corresponding to that sentence code in the sentence DB 25 is displayed in a frame 162.

When a fixed phrase is decided at the screen 71, the sentence code is established and the game progress management section 15 next displays a screen (screen 72) enabling input of "words" to be used in the fixed phrase. When input of word(s)

is finished a screen (screen 73) is displayed enabling input of the "sending limit number" and the "receiving limit number." Finally, a screen (screen 74) is displayed enabling input of the "valid period limit" and the "region." The values inputted at these screens are stored in the corresponding items of the data entry and the "ID" is generated automatically in the background, and therefore a single data entry is generated in this manner and the uncertain information management section 17 stores the data entry in the uncertain information DB 21.

Various types of uncertain information are generated by the above-described data entry accumulation processes. A player who receives uncertain information generated by such items as rivals, friends, and rare items set in the user information will attempt to find other players. This is because if a friend player can be discovered, it may be possible to cooperate and challenge a previously unconquerable opponent, and if a rival player is discovered, it may be possible to find a rare item.

A player who has received uncertain information generated based on a checkpoint will for example receive a rumor that another player may have reached a region as yet unknown to himself and a feeling will be stimulated of wanting to go there himself and actually confirming what will happen there such that this player will attempt to enjoy the game more deeply and enabling the player's interest in the game to be held longer. Furthermore, these types of information offer strategy hints, thereby also acting as assistance to beginners of the game.

Next, the sending and receiving processes (S3 at FIG. 12) of the data entries is described in detail.

Figure 17:
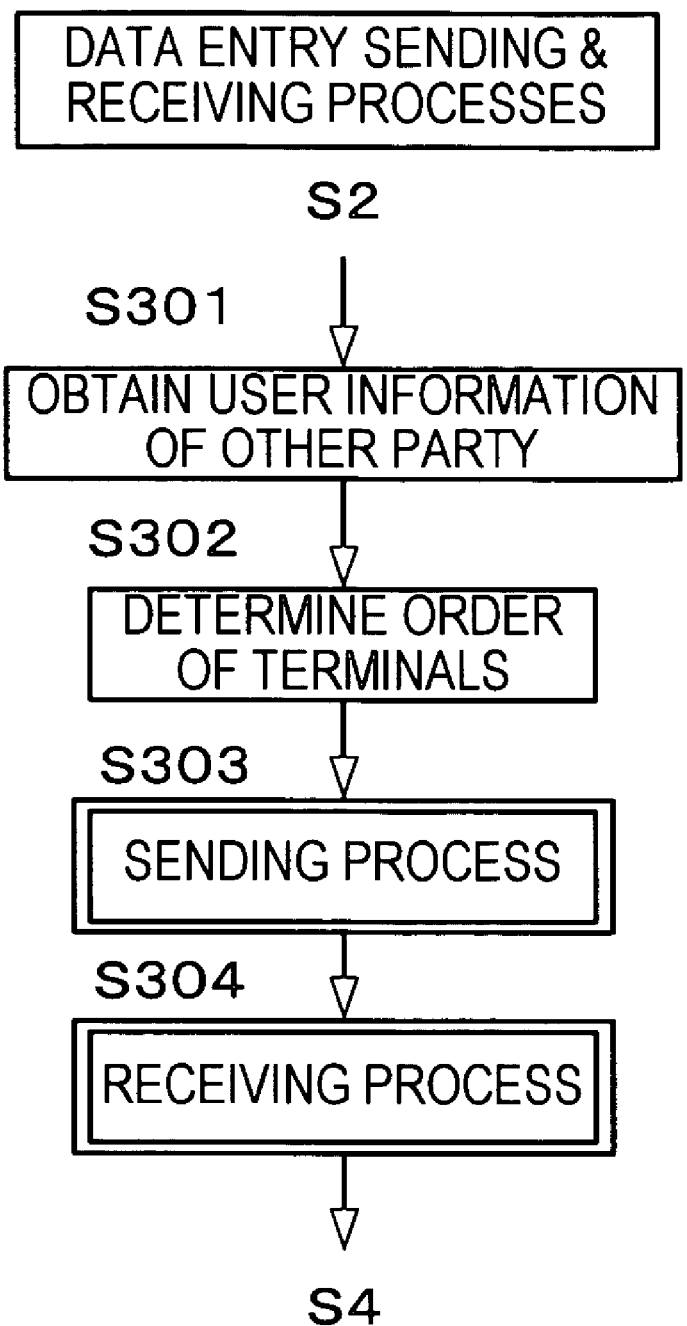
FIG. 17 shows sending and receiving processes in subdivided steps.

FIG. 17 shows the sending and receiving processes in subdivided steps. First, the game terminal obtains user information from the game terminal of another party and extracts (S301) the serial number contained therein. Following this, which of the game terminals is to send data entries first is determined (S302) by the terminal order.

The terminal order in step S302 is determined based on levels of priority set in the data entries. Here, the data entry with the larger number allotted to "type" in the data entry is set as the data entry having a higher level of priority. Then, a sum total value of the levels of priority of all the data entries stored in the uncertain information DB of each game terminal is calculated and those sum total values are exchanged.

The game terminal having the larger sum total value is higher in the order of terminals. In step S302, the game terminal that is higher in order carries out processes in the order of sending process (S303) and receiving process (S304) and the game terminal that is lower in order carries out processes in the order of receiving process (S304) and sending process (S303), and then the sending and receiving processes are finished. The flow shown in FIG. 17 shows the first part of this.

As a technique for determining the order of terminals in step S302, rather than using the sum total value of the levels of priority, it is also possible to use an average value in which the sum total value of the levels of priority are divided by the number of data entries stored in the uncertain information DB. Alternatively, the game terminal having more highest order level of priority data entries (for example, the one with a greater number of data entries in which the "type" is three may be determined as the game terminal being higher in order of terminals.

Next, detailed description is given of the sending process (S303 in FIG. 17) and the receiving process (S304 in FIG. 17). In propagating data entries containing uncertain information between game terminals, a process of not receiving again a data entry that has been received once and a process of not receiving again through another game terminal a data entry of a generative source of one's own terminal (these will both be referred to as a "loop-back prohibiting process") are implemented. This process is implemented because it is not necessary to display to a player again a data entry containing uncertain information that has already been read or that comes from a generative source of that player's own terminal and also, if it was permitted to receive the same data entries again, the content of the data entries would be altered in short periods of time, thereby losing consistency with previously received information, and so this process is implemented in order to prevent the risk of a player becoming confused.

First, the sending process is described.

FIG. 18A shows using a serial number to implement a loop-back prohibiting process at the time of sending. When carrying out the process shown in FIG. 18A, a data entry is used in which a further data item called "forwarding history" has been added. To which sending processes this will be applied is determined in advance, and therefore appropriate data entries should be used to match the determination.

When carrying out the process shown in FIG. 18A, a game terminal that has received a data entry records a "forwarding history" data entry of the serial number (this is determined by the storage medium or the like inserted at the time) and the date/time it was received, which are obtained by referencing the user information 24 of one's own terminal. In this way, by looking at the "forwarding history" data entry, it is possible to ascertain the manner in which that data entry was propagated.

First, the uncertain information management section 17 reads out from the uncertain information DB the data entry about to be sent and references the "forwarding history" of the data entry. Then, it examines (S331) whether or not a serial number relating to the other-party game terminal obtained in step S301 is contained in the "forwarding history." Then, if the serial number obtained in step S301 is contained in the "forwarding history" (yes at S331), sending is not carried out (S334), but if the serial number obtained in step S301 is not contained in the "forwarding history" (no at S331), the data entry is sent (S333). In this way it is possible to prevent a player that has obtained that data entry once before from seeing the same information again, thereby enabling confusion to be avoided.

However, once a predetermined time has passed, a duplicate data entry may be again shown to the player. This is because once sufficient time has passed before again receiving a data entry that one has received previously, a player will not be confused by that data entry, on the contrary it will have an effect of evoking memories in the player and reminding the player of information that had been forgotten. For example, the data entry may cause the player to recall the circumstances of a time associated with a location, person, or event that was of interest to the player, thereby creating curiosity in the present circumstances and the player may delve into the game again.

Consequently, in the case of "yes" at S331, this means that the same data entry has been received previously, but a step (S332) may be provided of determining whether or not a predetermined time has passed since receiving (the data entry) the previous time, and when the predetermined time has passed (yes at S332), the data entry may be sent (S333). At step S332, if the predetermined has not passed (no at S332), then a likelihood remains that the player will be confused and that data entry is not sent (S334). The predetermined time in step S332 can be set to six months for example.

When there are multiple data entries to be sent, the uncertain information management section 17 repetitively carries out the process shown in FIG. 18A. The number and selection of data entries to be sent can be freely set using data items contained in the data entries. Accordingly, for example, a sending policy can be controlled by a system designer (system manager) involving the use of date information contained in the "ID" of data entries and sending the ten latest data entries.

FIG. 19 is a diagram for describing a specific example of the process shown in FIG. 18A. When the terminal A receives a data entry, the serial number of a software A currently inserted in the terminal A and the date/time are recorded in the "forwarding history" of that data entry.

A forwarding history 191 indicates the "forwarding history" of when the terminal A has received the data entry. Due to the forwarding history 191, it is evident from the serial number included at the beginning thereof that the generative source of the indicated data entry is a software X. Then, since the next serial number is that of the software A, it is evident that the data entry has been propagated from the generative source directly to the terminal A in which the software A is inserted.

At this time, the terminal A is in a communicable state with the terminal B and when a data entry is to be sent, the terminal A obtains the user information of the terminal B and extracts (step S301 in FIG. 17) the serial number of the software inserted in the terminal B. Then, since the serial number of the software B inserted in the other-party communication terminal, terminal B, in the forwarding history of that entry is not listed in the forwarding history 191 of the data entry, the terminal A sends the data entry to the terminal B (no at step S331→S333 in FIG. 18A).

Having received the data entry, the terminal B records in the "forwarding history" the serial number of the software B inserted in the terminal B and the date. A forwarding history 192 indicates the "forwarding history" of when the terminal B has received the data entry.

At this time, the terminal B is in a communicable state with the terminal C and when a data entry is to be sent, since the serial number of a software C inserted in the other-party communication terminal, terminal C, in the forwarding history of that entry is not listed in the forwarding history 192 of the data entry, the terminal B sends the data entry to the terminal C.

In the same manner as above, a forwarding history 193 indicates the "forwarding history" of when the terminal C has received the data entry. At this time, even though the terminal C is in a communicable state with the terminal A, since the serial number of the software A inserted in the other-party communication terminal terminal A in the forwarding history of the data entry is listed in the forwarding history 192, the terminal C does not sent the data entry to the terminal A (yes at step S331→S334 in FIG. 18A).

In this way, it is possible to assure that a data entry is not sent to a game terminal in which software is inserted having a serial number that has been listed in the forwarding history. It should be noted that this process may be configured such that, in carrying out sending from the terminal C to the terminal A in FIG. 19, a determination is made as to whether or not a predetermined time has passed and if this has passed (yes at step S332 in FIG. 18A), the data entry is sent.

Returning to FIG. 18B, described next is using an event flag to implement a loop-back prohibiting process at the time of sending. A process shown in FIG. 18B is applicable to data entries in which an event flag has been set.

First, the game terminal obtains (S335) the event DB of the other-party communication game terminal. Then, the uncertain information management section 17 reads out from the uncertain information DB the data entry about to be sent and references the "event flag" of the data entry. Then, if it is indicated that the event flag is ON (for example, when a value 1 is stored), the status of the on/off flag of the event DB obtained in step S335 of the other-party communication game terminal is checked (S336) using the sentence code of that data entry. If the on/off flag of the other-party communication game terminal is OFF (no at S336), then this means that the event relating to the data entry about to be sent has not occurred on the other-party communication game terminal, and therefore the data entry is sent (S333). However, if the on/off flag of the other-party communication game terminal is ON (yes at 336), this means that the other-party communication game terminal has already received that data entry and the corresponding event has already occurred there, and therefore the data entry is not sent (S334). When there are multiple data entries to be sent, the uncertain information management section 17 repetitively carries out the process shown in FIG. 18B.

Figure 20:
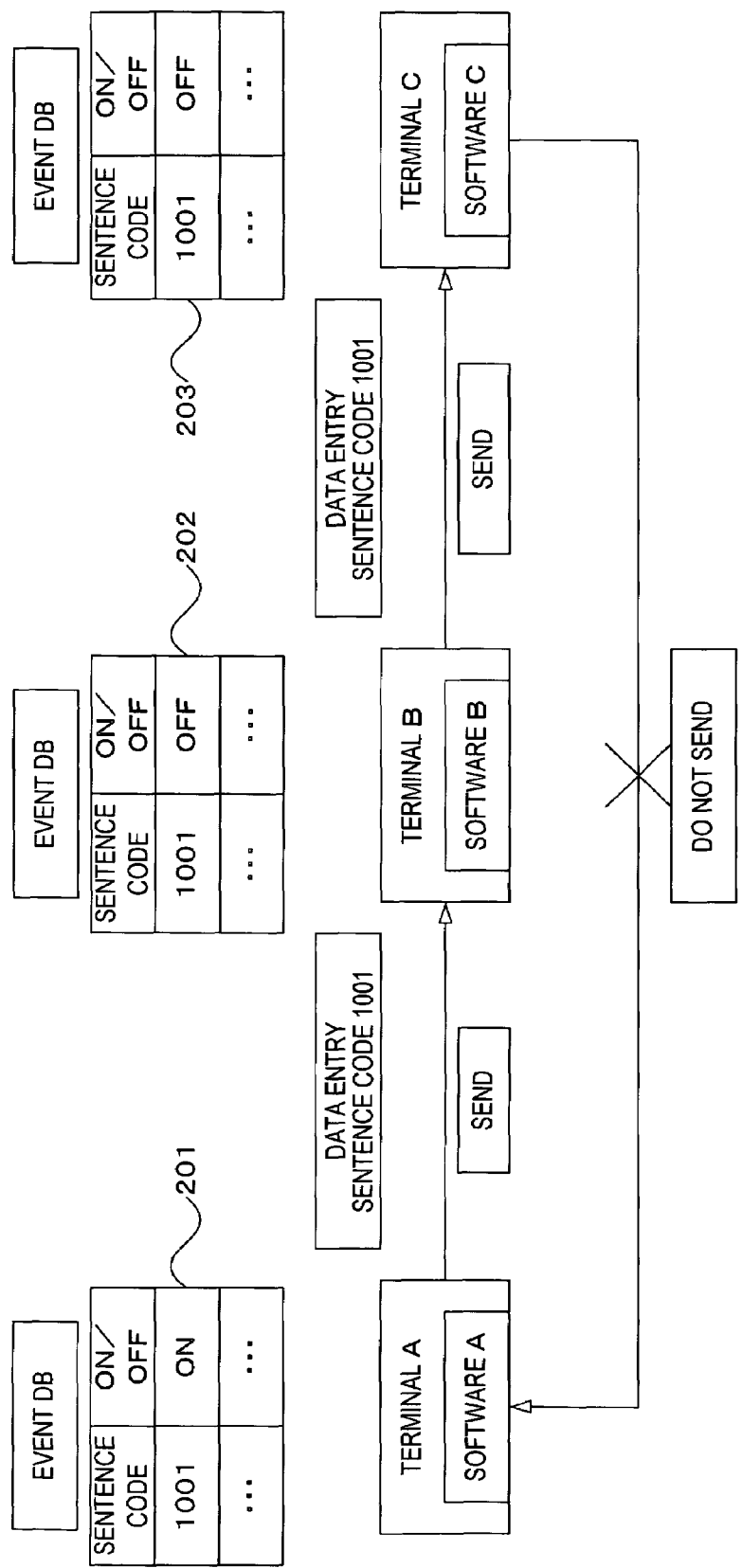
FIG. 20 is a diagram for describing a specific example of the process shown in FIG. 18B.

FIG. 20 is a diagram for describing a specific example of the process shown in FIG. 18B. The event DB 201 shows a sample of the event DB of the terminal A at a particular point in time. It is evident from the event DB 201 that a data entry corresponding to the sentence code 1001 has been received at the terminal A and that the event linked with this has occurred.

At this time, the terminal A is in a communicable state with the terminal B and when the data entry having a sentence code of 1001 is to be received, the terminal A obtains an event DB 202 of the terminal B (step S335 in FIG. 18B). Then, when it is confirmed that the on/off flag is OFF for the event corresponding to the sentence code 1001 in the event DB 202 of the terminal B, the terminal A sends the data entry to the terminal B (no at step S336→S333 in FIG. 18).

Similarly, the terminal B is in a communicable state with the terminal C, and when the data entry is to be sent, the terminal B obtains an event DB 203 of the terminal C, and when it is confirmed that the on/off flag is OFF for the entry corresponding to the sentence code 1001 in the event DB 203, the terminal B sends the data entry to the terminal C.

Then, when the terminal C and the terminal A go into a communicable state, the terminal C obtains the event DB 201 of the terminal A, and since the on/off flag for the entry corresponding to the sentence code 1001 in the event DB 201 of the terminal A is already ON, the terminal C does not send the data entry to the terminal A (no at step S336→S334 in FIG. 18).

In this way, the sending of data entry is carried out in response to the on/off flag of the event DB such that the data entry is not sent when a data entry has been received and the event already created, thereby enabling duplicate reception of the same data entries to be avoided.

Next, the receiving process is described.

Figures 21A, 21B, 21C:
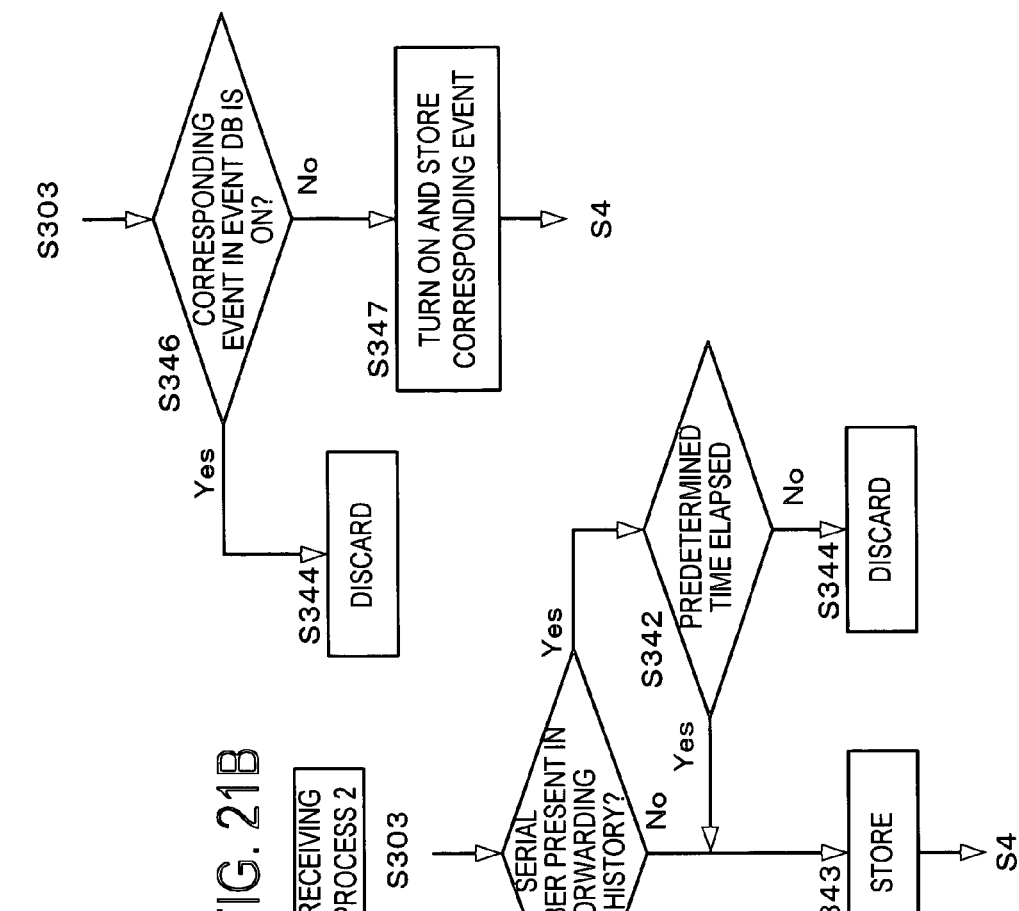
FIG. 21A is a flowchart for describing when using an ID to implement a loop-back prohibiting process at a time of receiving.
FIG. 21B is a flowchart for describing when using a serial number to implement a loop-back prohibiting process at a time of receiving.
FIG. 21C is a flowchart for describing when using an event flag to implement a loop-back prohibiting process at a time of receiving.

FIG. 21A shows using the ID that identifies each data entry (see FIG. 5A) to implement a loop-back prohibiting process at the time of receiving. When a data entry is received, the uncertain information management section 17 checks (S341) whether or not a data entry having the same ID as the ID of the received data entry is already stored in the uncertain information DB. Then, if this is not stored (no at S341), then the received data entry is stored (S343) in the uncertain information DB, but if a data entry having the same ID is already stored (yes at S341), then the received data entry is discarded (S344). In this way it is possible to prevent a player that has obtained that data entry once before from seeing the same information again, thereby enabling confusion to be avoided.

However, once a predetermined time has passed, a duplicate data entry may be again shown to the player. A reason for this is that, similar to the sending process of step S332 of FIG.

18A, this will have an effect of evoking memories in the player and reminding the player of information that had been forgotten.

Consequently, in the case of "yes" at S341, this means that the same data entry has been received previously, but a step (S342) may be provided of determining whether or not a predetermined time has passed since receiving (the data entry) the previous time, and when the predetermined time has passed (yes at S342), the data entry may be stored (S343). At step S342, if the predetermined has not passed (no at S342) then a likelihood remains that the player will be confused and that data entry is discarded (S344). The predetermined time in step S342 can be set to six months for example.

When there are multiple data entries to be received, the uncertain information management section 17 repetitively carries out the process shown in FIG. 21A.

FIG. 21B shows using a serial number to implement a loop-back prohibiting process at the time of receiving. When carrying out the process shown in FIG. 21B, a data entry is used in which a further data item called "forwarding history" has been added as mentioned earlier in the description of FIG. 18A.

First, the uncertain information management section 17 references the "forwarding history" of the received data entry. Then, it examines (S345) whether or not a serial number contained in the user information of the receiving terminal is contained in the "forwarding history." Then, when the serial number of one's own terminal is contained in the "forwarding history" (yes at S345), the received data entry is discarded (S334), and when the serial number of one's own terminal is not contained in the "forwarding history" (no at S345), the serial number of one's own terminal and the date/time are recorded in the forwarding history of the received data entry and that data entry is stored (S343). In this way it is possible to prevent a player that has obtained that data entry once before from seeing the same information again, thereby enabling confusion to be avoided.

However, once a predetermined time has passed, a duplicate data entry may be again shown to the player. Consequently, in the case of "yes" at S345, this means that the same data entry has been received previously, but a step (S342) may be provided of determining whether or not a predetermined time has passed since receiving (the data entry) the previous time, and when the predetermined time has passed (yes at S342), the data entry may be stored (S343). At step S342, if the predetermined has not passed (no at S342) then a likelihood remains that the player will be confused and that data entry is discarded (S344). The predetermined time in step S342 can be set to six months for example.

When there are multiple data entries to be received, the uncertain information management section 17 repetitively carries out the process shown in FIG. 21B.

Figure 22:
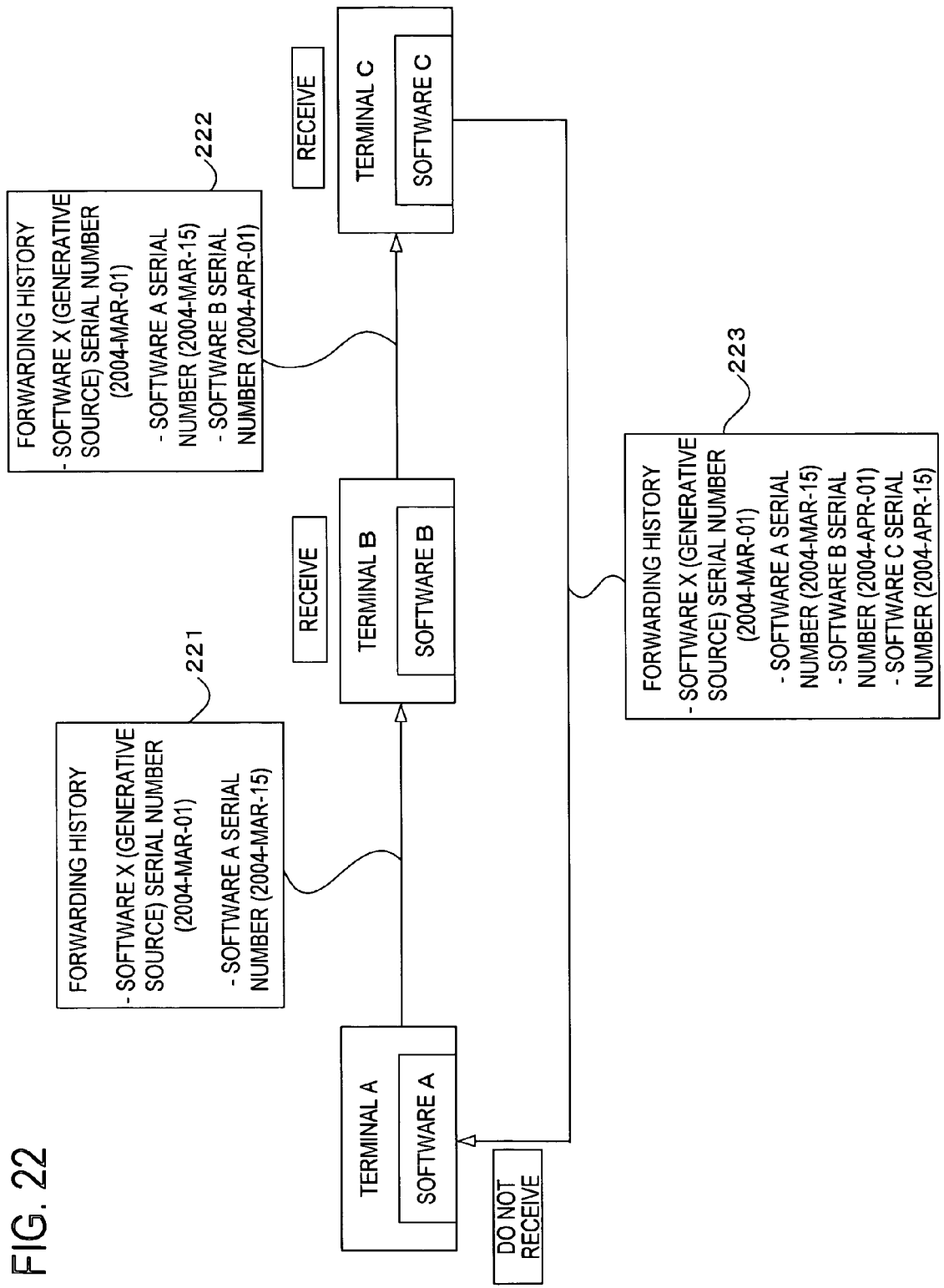
FIG. 22 is a diagram for describing a specific example of the process shown in FIG. 21B.

FIG. 22 is a diagram for describing a specific example of the process shown in FIG. 21B. A forwarding history 221 indicates the forwarding history of when the terminal A sends a particular data entry to the terminal B. From the serial number listed at the front of the forwarding history, the terminal A can perceive that a data entry whose generative source is the software X has been directly received from the generative source and that the serial number of the software A inserted in one's own terminal and the date of reception is recorded.

Since the serial number of the software B inserted in the terminal B is not contained in the "forwarding history" of the received data entry, the terminal B records the serial number of the software B inserted in the terminal B and the date in the "forwarding history" and stores the received data entry in the uncertain information DB of the terminal B ("no" at step S345→S343 in FIG. 21B).

A forwarding history 222 indicates the forwarding history of when the terminal B sends the data entry to the terminal C. Since the serial number of the software C inserted in the terminal C is not contained in the "forwarding history" of the received data entry, the terminal C records the serial number of the software C inserted in the terminal C and the date in the "forwarding history" and stores the received data entry in the uncertain information DB of the terminal C.

A forwarding history 223 indicates the forwarding history of when the terminal C sends the data entry to the terminal A. Since the serial number of the software A inserted in the terminal A is contained in the "forwarding history" of the received data entry, the terminal A discards that data entry (yes at step S345→S344 in FIG. 21B).

In this way, it is possible to assure that a data entry is not received at a game terminal in which software is inserted having a serial number that has been listed in the forwarding history. It should be noted that this process may be configured such that, in carrying out sending from the terminal C to the terminal A in FIG. 22, a determination is made as to whether or not a predetermined time has passed and if this has passed (yes at step S342 in FIG. 21B), the data entry is stored.

Returning to FIG. 21C, described next is using an event flag to implement a loop-back prohibiting process at the time of receiving. A process shown in FIG. 21C is applicable to data entries in which an event flag has been set.

First, the uncertain information management section 17 obtains the sentence code contained in the received data entry and references (S346) the "on/off flag" of the entry corresponding to that sentence code in the terminal's own event DB. If the on/off flag is OFF (no at S346), this means that the event relating to the received data entry has not yet been created on the receiving terminal, and therefore the data entry is stored in the uncertain information DB, the on/off flag of the corresponding entry in the event DB is turned ON, and the event is activated (S347). However, if the on/off flag is ON (yes at 346), this means that the data entry has already been received, and the corresponding event has already been created, and therefore the data entry is discarded (S344).

Figure 23:
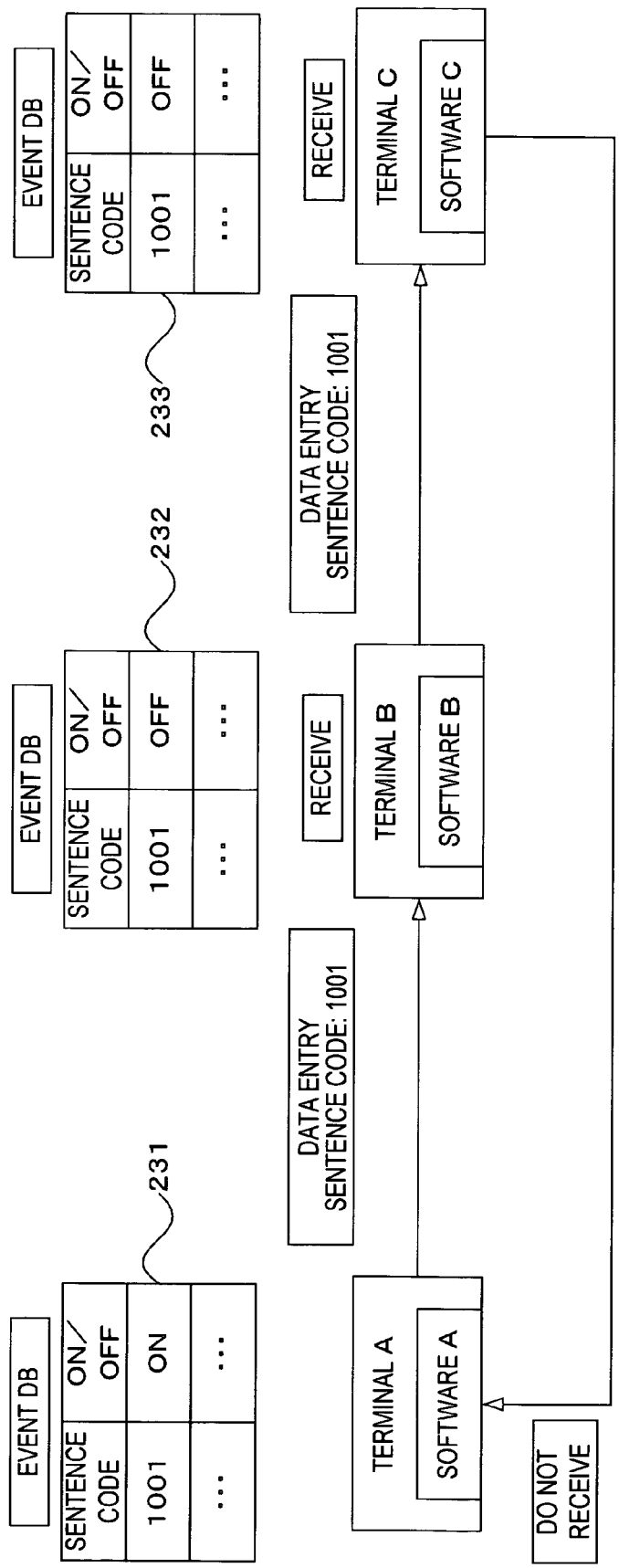
FIG. 23 is a diagram for describing a specific example of the process shown in FIG. 21C.

FIG. 23 is a diagram for describing a specific example of the process shown in FIG. 21C. The event DB 231 shows a sample of the event DB of the terminal A at a particular point in time. It is evident from the event DB 231 that a data entry corresponding to the sentence code 1001 has been received at the terminal A and that the event linked with this has occurred.

At this time, the terminal A is in a communicable state with the terminal B, and when the data entry in which the sentence code is 1001 is received at the terminal B, the terminal B obtains its own event DB 232 and when it confirms that the on/off flag of the entry in which the sentence code corresponds to 1001 in the event DB 232 of the terminal B is OFF, the data entry is stored and the entry in which the sentence code corresponds to 1001 is updated to ON (no at step S346→347 in FIG. 21C). Due to the "on/off flag" going ON, the event in which the sentence code corresponds to 1001 in the terminal B is created.

Similarly, the terminal B is in a communicable state with the terminal C, and when the data entry is to be received at the terminal C, the terminal C obtains its own event DB 233 and when it confirms that the on/off flag of the entry in which the sentence code corresponds to 1001 in the event DB 233 is OFF, the terminal C stores the data entry.

Then, the terminal C is in a communicable state with the terminal A, and when the data entry is to be received at the terminal A, the on/off flag of the entry in which the sentence code corresponds to 1001 in the event DB 231 is already ON and therefore the terminal A discards the data entry (no at step S346→S344 in FIG. 21C).

In this way, the receiving of data entries is carried out in response to the on/off flag of the event DB such that the data entry is not sent when a data entry has been received and the event already created, thereby enabling duplicate reception of the same data entries to be avoided.

Furthermore, in the foregoing description, processes were carried out prior to storage in the uncertain information DB in order to prevent duplicate storage of data entries, but it is also possible to restrict display to the player according to settings such as the forwarding history and the event flag even though all data entries are temporarily stored in the uncertain information DB. In this case, in the receiving process shown in FIG. 21, prior to display a process can be carried out in which "store" in step S343 is changed to "display" and "discard" in step S344 is changed to "do not display." Additionally, a setting involving not displaying once a predetermined date/time has elapsed is also possible.

Next, variation processes carried out on received data entries are described. This is included in step S6 of FIG. 12.

FIG. 24A is a flowchart that describes when a data entry undergoes variation based on rules stored in the rule variation DB 23. When the predetermined threshold value becomes unmet as a result of the degree of accuracy of the received data entry being reduced, the uncertain information management section 17 determines (S601) the "sentence code" and "words" for the post-variation fixed phrase based on the rule variation DB 23.

For example, in the rule variation DB 23 shown in FIG. 10, when the sentence code of the received data entry is 001 and the degree of accuracy is less than 60, the sentence code is changed to 100 and the uncertain information is varied in that "rival" is carried on as a word item.

Then, the uncertain information management section 17 updates (S602) the "sentence code" and "word" of the received data entry to the "sentence code" and "word" determined in step S1, then proceeds to step S1 and stores the data entry in the uncertain information DB 21. In the above example, based on the rule variation DB of FIG. 10, the data entry corresponding to the uncertain information "Taro seems to think that Jiro is a rival" prior to variation (that is, the sentence code is 001 and the words are Taro and Jiro), becomes a data entry corresponding to the uncertain information "there seems to be someone who thinks Jiro is a rival" after variation (that is, the sentence code is 100 and the word is "Jiro").

FIG. 24B is a flowchart that describes when a data entry undergoes variation by varying the fixed phrase to a different fixed phrase. When the predetermined threshold value becomes unmet as a result of the degree of accuracy of the received data entry being reduced, the uncertain information management section 17 specifies (S611) word items to be used in the fixed phrase corresponding to the sentence code of the received data entry. For example, if the sentence code of the received data entry is 004, by referencing the sentence DB 25 shown in FIG. 3 it is evident that "enemy, item" are to be used as word items.

Next, the uncertain information management section 17 selects (S612) from the sentence DB a fixed phrase having the same word items as the word items specified in step S1. In doing this, a "sentence code" corresponding to the fixed phrase is selected. For example, by referencing the sentence DB 25 shown in FIG. 3, the fixed phrase whose sentence code is 006 is an instance of a fixed phrase having "enemy, item" as word items the same as above.

Then, the "sentence code" of the received data entry is updated (S613) to the "sentence code" of the fixed phrase selected in step S2, the procedure proceeds to step S1, and the uncertain information management section 17 stores the data entry in the uncertain information DB 21. In the above example, the data entry corresponding to the uncertain information "it seems you can obtain a scroll if you defeat the giant ogre" prior to variation (that is, the sentence code is 004 and the words are "giant ogre, scroll") becomes a data entry corresponding to the uncertain information "it seems the giant ogre can be defeated if you use a scroll" after variation (that is, the sentence code is changed to 006).

Figure 25:
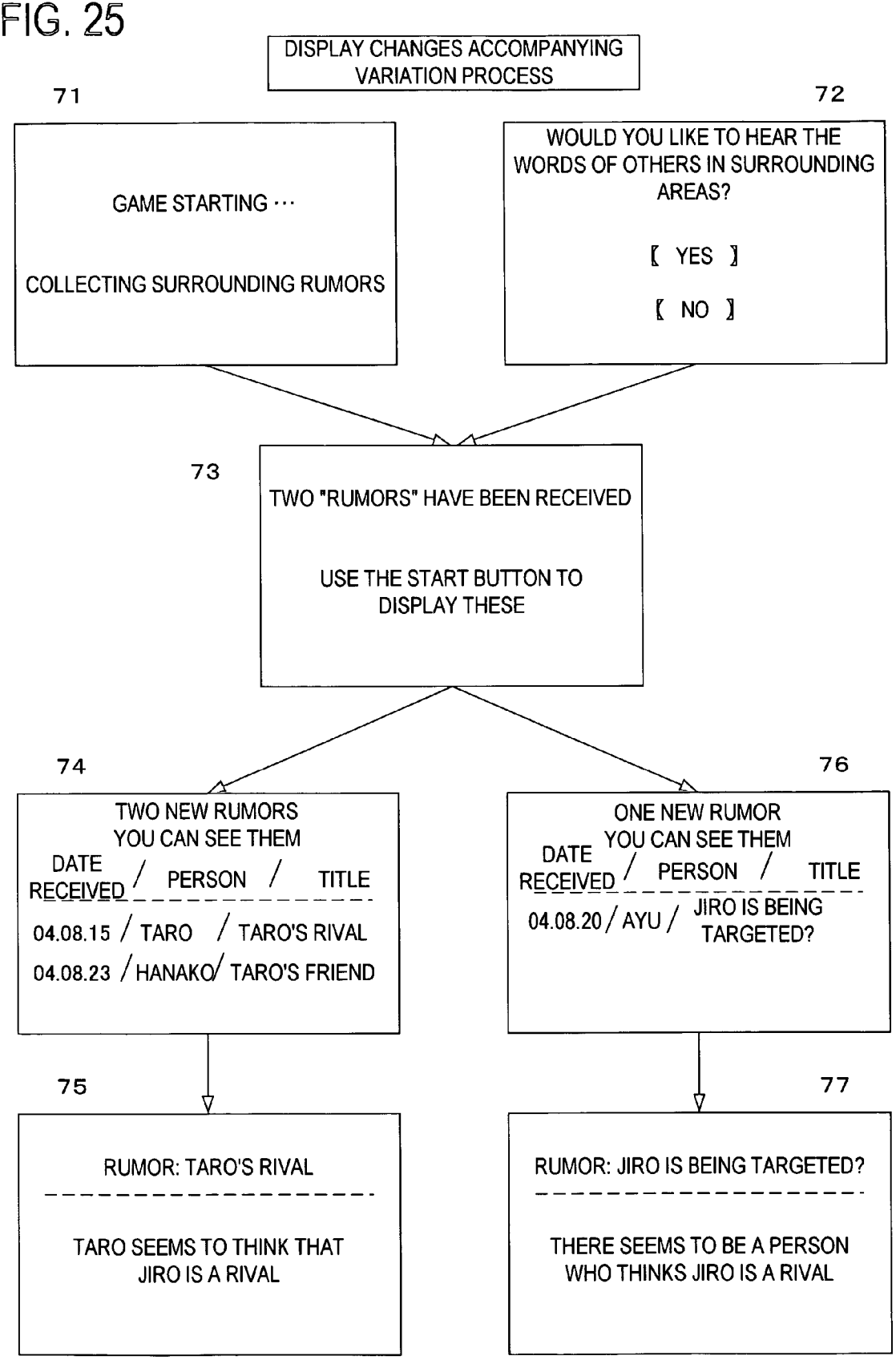
FIG. 25 shows example screens of when fixed phrases such as those in FIG. 24A and FIG. 24B are varied to different fixed phrases.

FIG. 25 shows example screens of when fixed phrases such as those in FIG. 24A and FIG. 24B are varied to different fixed phrases. Gathering of uncertain information can be carried out at the startup of the game for example (screen 71). Here, when the game terminal 1 is powered up, a determination (S2 in FIG. 12) is carried out as to whether or not there are any communicable game terminals 1 nearby. Then, when data entries are received, the game progress management section 15 displays a message to that effect (screen 73). Here, the player is notified by expressing the data entries of uncertain information as "rumors."

Gathering of uncertain information can be carried out also during game play (screen 72). For example, in the game menu 141 in screen 63 of FIG. 14, when the item "obtain uncertain information" is selected, the screen 72 is displayed. When "yes" is selected at the screen 72, the procedure proceeds to screen 73.

In FIG. 25, display is given branching into two parts, with the left side row showing data entries prior to variation and the right side row showing how data entries are after being varied in the process of data entries being propagated between game terminals. When a data entry of uncertain information is received, the date of reception, the name of the other party, and the title are shown in a list form (screen 74 and screen 76). Then, by selecting from the list the uncertain information that the player desires to be confirmed, the content thereof is displayed (screen 75 and screen 77). It is evident from FIG. 25 that the sentences to be displayed are different prior to variation and after variation according to the variation of the sentence code and words of the data entries.

Description is continued returning to FIG. 24. FIGS. 24A and 24B involve variation for each fixed phrase, but FIG. 24C is a flowchart that describes when a data entry undergoes variation by replacing the words to be used in the fixed phrases.

In FIG. 24C, when the predetermined threshold value becomes unmet as a result of the degree of accuracy of the received data entry being reduced, the uncertain information management section 17 specifies the fixed phrase corresponding to the sentence code of the received data entry and selects (S621) word items to be used in that fixed phrase. For example, if the sentence code of the received data entry is 501, by referencing the sentence DB 25 shown in FIG. 3 it is evident that "subject, location" are to be used as word items, and here "location" is selected. Selection of word items may be carried out for example by having the uncertain information management section 17 generate a random number, then calculating a remainder of dividing the random number by the number of word items, and selecting a corresponding item according to that remainder. In the above example the number of items is four, and therefore if the remainder of dividing the random number by four is zero, "subject" is selected, if this is one, "location" is selected, if this is two, "enemy" is selected, and if this is three, "item" is selected. It should be noted that in step S621, the uncertain information management section 17 may select multiple words to be replaced at one time.

Next, the uncertain information management section 17 selects (S622) from the word candidate DB 26 shown in FIG. 11 a "post-variation word" corresponding to the word item selected in step S621. For example, from the four word candidates (Ogre Island, dragon castle, isolated village, and port town) given for "location" in FIG. 11, "dragon castle" is selected. The selection in step S622 may also be a selection carried out using a random number as described as an example in step S621. Then, the uncertain information management section 17 updates (S623) words by replacing only the word items selected in step S621 of the words of the received data entry to the "post-variation words" selected in step S622, then proceeds to step S1 and stores the data entry in the uncertain information DB 21.

Specifically, the data entry corresponding to the uncertain information "it seems Taro has obtained a scroll by defeating the giant ogre at Ogre Island" prior to variation (that is, the sentence code is 501 and the words are "Taro, Ogre Island, giant ogre, scroll") becomes a data entry corresponding to the uncertain information "it seems Taro has obtained a scroll by defeating the giant ogre at dragon castle" after variation (that is, the words are changed to "Taro, dragon castle, giant ogre, scroll").

FIG. 26 shows example screens of when words are replaced. In the process of propagation between game terminals, the uncertain information shown in the first screen 78 changes to screen 79→screen 80→screen 81. In FIG. 26, characters for the word "reliability" are shown but this is different from the "degree of accuracy" (see FIG. 5A) of the data entries, and here this is a numerical value calculated simply by ("receiving limit number"+1)*25 for example. Figures such as this indicating reliability may be displayed to the player as a reference value.

Here, although the content of the data entry is not varied in screen 79→screen 80, the reliability is reduced. At screen 81, the word item "item" is replaced, thereby further increasing uncertainty.

Description is continued returning to FIG. 24. FIG. 24D is a flowchart that describes when a data entry undergoes variation by using bold letters to replace a portion of the words to be used in a fixed phrase. When the predetermined threshold value becomes unmet as a result of the degree of accuracy of the received data entry being reduced, the uncertain information management section 17 specifies the fixed phrase corresponding to the sentence code of the received data entry and selects (S631) word items to be used in that fixed phrase. For example, if the sentence code of the received data entry is 501, by referencing the sentence DB 25 shown in FIG. 3 it is evident that "subject, location" are to be used as word items, and here "location" is selected. The selection in step S631 may also be a selection carried out using a random number as described in step S621. It should be noted that in step S631, the uncertain information management section 17 may select multiple words to be shown in bold letters.

Next, the uncertain information management section 17 replaces (S632) a portion of the words corresponding to the selected word item with bold letters. For example, when the value "Ogre Island" is stored as the "location," two-thirds of the letters thereof (here shown as large asterisks) are replaced with bold letters. The number and position of characters to be made bold are arbitrary. Then, the uncertain information management section 17 updates (S633) words by replacing only the word items selected in step S631 of the words of the received data entry to words in which a portion of the letters are changed to bold letters in step S632, then proceeds to step S1 and stores the data entry in the uncertain information DB.

Specifically, the data entry corresponding to the uncertain information "it seems Taro has obtained a scroll by defeating the giant ogre at Ogre Island" prior to variation (that is, the sentence code is 501 and the words are "Taro, Ogre Island, giant ogre, scroll") becomes a data entry corresponding to the uncertain information "it seems Taro has obtained a scroll by defeating the giant ogre at  island" after variation (that is, the words are changed to "Taro,  island, giant ogre, scroll").

FIG. 27 shows example screens of when a portion of a word is changed to bold letters. In the process of propagation between game terminals, the uncertain information shown in the first screen 82 changes to screen 82→screen 83→screen 84. In FIG. 27, characters for the word "reliability" are shown, but this is the same as that shown in FIG. 26. In screen 82, bold letter replacement has advanced due to screen 85, thereby further increasing uncertainty.

With the data entry variation processes described above, when the degree of accuracy of a received data entry falls below the predetermined threshold value, the data entry is varied such that its uncertainty is gradually increased in such ways as selecting a sentence code corresponding to a different fixed phrase, replacing a portion of words to be used in the received data entry, and changing a portion to bold letters. In this manner, information having a certain degree of accuracy is transmitted to game terminals that are temporally or spatially close to the generative source of the uncertain information, while information having increased uncertainty is sent to game terminals that are temporally or spatially distant. In this way, a range of uncertain information whose authenticity cannot be ascertained is mixed, thereby stimulating the player's curiosity in the uncertain information, attracting more interest in the game, and enabling interest in the game to be held longer.

It should be noted that in the first embodiment the degree of accuracy was defined for example as being set to 100 as an initial value and decreased by a predetermined value (for example, 20) each time of reception, but this may also be set as a value calculated based on reliability as described in FIG. 26 or similarly on information of number of times of forwarding ("receiving number limit" or the like). Furthermore, a value may be calculated according to an extent of variation of a received data entry. For example, for a case in which a portion is being changed to bold letters in the process of varying the data entry, this can be calculated for example as (number of bold letters/number of letters contained in sentence)*100.

With the foregoing first embodiment, the degree of accuracy is gradually reduced in the process of data entries (uncertain information) being propagated between information terminals, and since the data entries are varied when the degree of accuracy does not meet a predetermined threshold value, the information becomes even more uncertain, thereby making the user who obtains this extremely interested in the authenticity of that information. And thus interest can be attracted in the program executed on the information terminal in order to confirm the authenticity of the data entry. Furthermore, the degree of accuracy of the data entry may be reduced at the sending side information terminal or may be reduced at the receiving side information terminal.

By obtaining uncertain information, a player will obtain for example a hint relating to a location in the game to which the player has not been (such as a hint relating to the existence of a location or the route to a location). In this manner, a player will be able to reach a location that cannot be achieved alone and can more deeply enjoy the game. Furthermore, the player can be made to have curiosity in wanting to go to that location, thereby having an effect of making the game enjoyable for longer. Also, when obtaining the progress status of other players as uncertain information, a player who does not want to be overtaken by other players will be given motivation to play the game. Furthermore, being able to set rivals and friends within the game and giving the motivation to act to find such players in the real world leads to the game being enjoyed longer and with greater interest. Also, the game terminals move accompanying the movements of the player in the real world, thereby further facilitating the propagation of uncertain information.

Furthermore, it is also possible to mix and propagate information (for example, public information that a maker announces publicly) whose contents are not desired to be changed in response to the data items used in data entries stored in the uncertain information DB shown in FIG. 5 with information whose content is to be varied, and to prevent same data entries looping between information terminals, as well as to set the range, number, and valid period limit for data entries to be disseminated in order to prevent unlimited dissemination of data entries, and to generate data entries that are valid only in a certain period for use in promotions and campaign information.

Next, an operation of an information terminal of the second embodiment is described.

Figure 28:
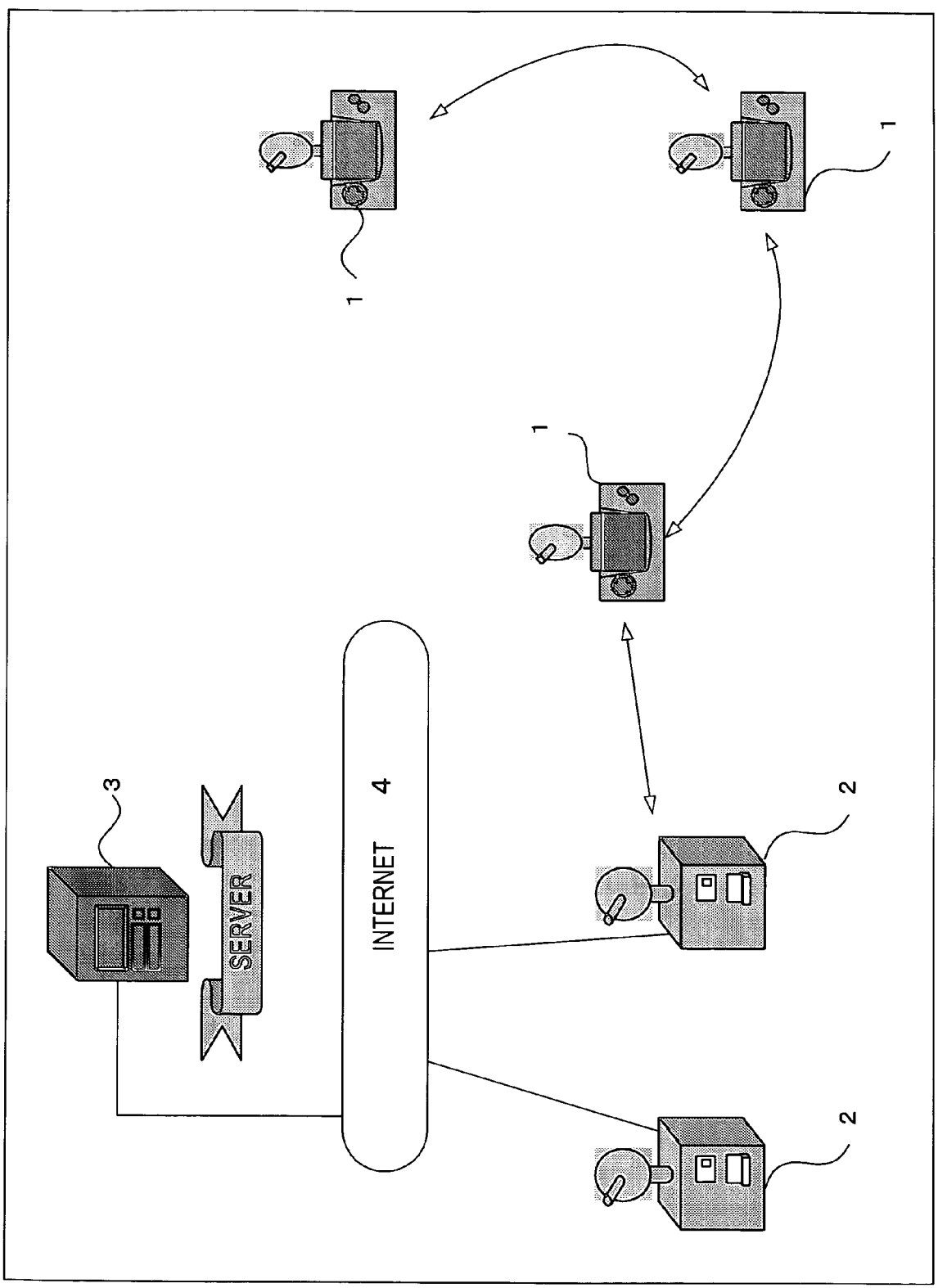
FIG. 28 shows a structural diagram of an information transmission system according to the second embodiment.

FIG. 28 shows a structural diagram of an information transmission system according to the second embodiment. In the second embodiment, a server 6 and multiple information relay terminals 8 are connected via an Internet 7, and uncertain information stored in the server 6 is propagated to the game terminals 1 via the information relay terminals 8. Players operate menus displayed on the information relay terminals 8 and send requests to obtain uncertain information to the server 6. Then, the information relay terminals 8 forward uncertain information sent from the server 6 to the game terminals 1 of players who sent the obtain requests.

In the second embodiment, by using a server, the uncertain information of the various game terminals can be concentrated. Furthermore, the server is an entity capable of distributing to game terminals uncertain information in which unique data entries do not change, enabling the execution of promotional information and campaigns and the like, thereby making the game able to be more interesting. Furthermore, the configuration and operation of the game terminals are the same as the first embodiment and therefore description thereof is omitted.

Figure 29:
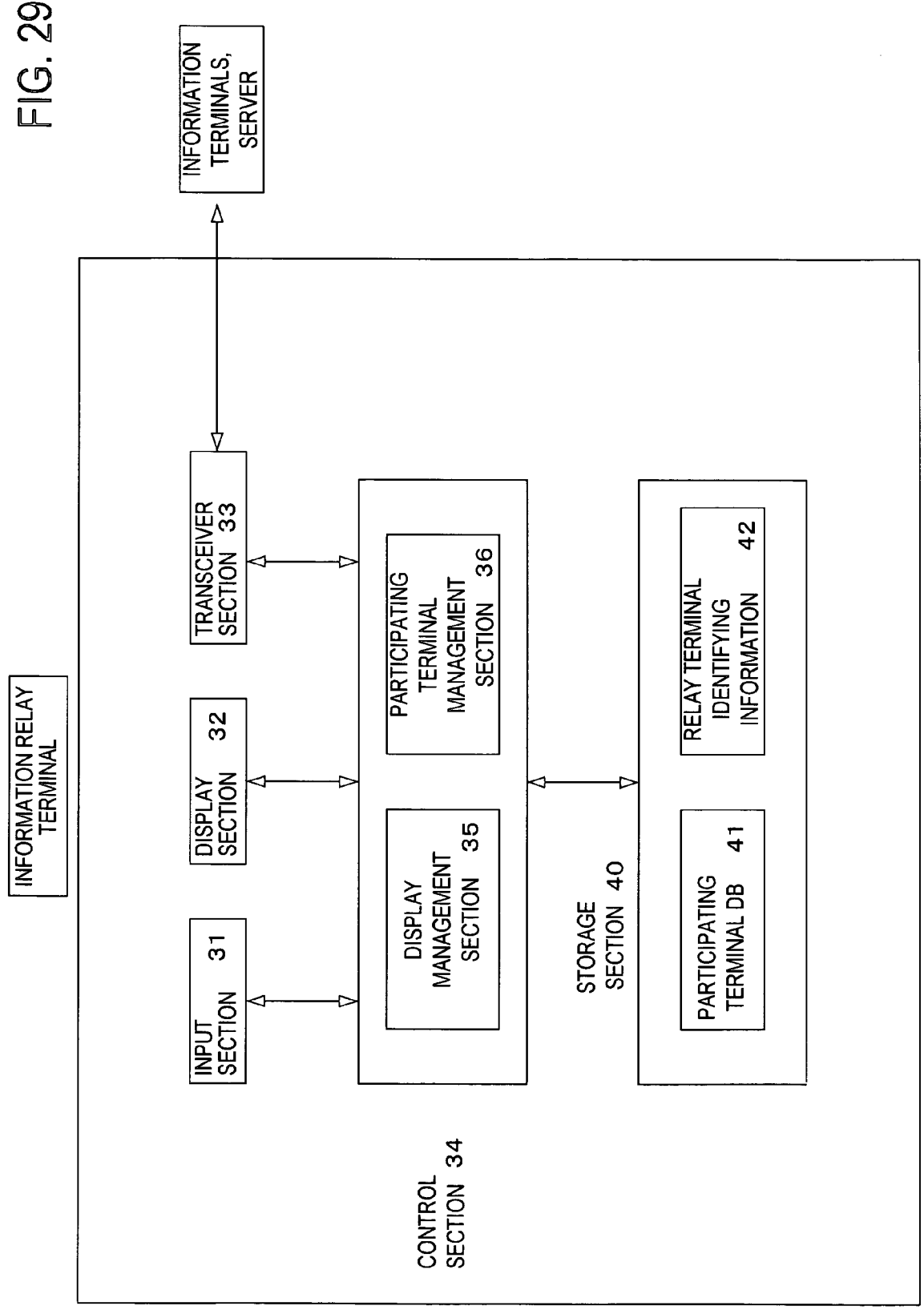
FIG. 29 is a block diagram illustrating a configuration of an information relay terminal 8.

FIG. 29 is a block diagram illustrating a configuration of an information relay terminal 8. The information relay terminal 8 has an input section 31, a display section 32, a transceiver section 33, a control section 34, and a storage section 40, and the control section 34 includes a display management section 35 and a participating terminal management section 36. In the present embodiment, the display management section 35 and the participating terminal management section 36 are program modules provided in the control section 34 and executed by a CPU omitted from the drawings, but these may also be achieved using hardware circuitry.

The display management section 35 displays screens for operating the information relay terminal 8 on the display section 32, receives commands inputted by a player via the input section 31, and outputs screens in accordance with those commands. The input section 31 corresponds for example to a keyboard, touch panel, or buttons or the like provided in each of the information relay terminals 8 but not shown in the drawings, and the display section 32 corresponds for example to a liquid crystal screen not shown in the drawings. The input section 31 and the display section 32 function as an interface to the player.

The participating terminal management section 36 manages a participating terminal database (participating terminal DB) 41 in which information relating to the information relay terminals 8 and communicable game terminals is stored. Of the game terminals 1 stored in the participating terminal DB 41, the participating terminal management section 36 deletes information relating to game terminals 1 that have moved outside the communication range of the information relay terminals 8 and updates the participating terminal DB 41 to the latest status. In addition to user information of the players, stored in the participating terminal DB 41 are addresses (such as IP (internet protocol) and MAC (media access control) addresses) of the game terminals 1, such addresses being necessary when the information relay terminals 8 forward uncertain information sent from the server 6.

The transceiver section 33 has a communication function of communicating with the server 6 connected to the Internet 7 and the game terminals 1 collected by the information relay terminals 8. This may be achieved by a wireless communication function via a communication antenna built into or externally attached to the information relay terminals 8 and wireless communication may be conducted with the game terminals 1 while wired communication is conducted with the server 6 being connected by cable.

When there is a game terminal 1 capable of wireless communication, the transceiver section 33 obtains the user information and outputs this with the address to the participating terminal management section 36 and sends to the server 6 requests to obtain uncertain information that the player inputs via the input section 31.

Stored in the storage section 40 are a control program, the participating terminal DB 41, information 42 specific to each information relay terminal, and other data necessary in processes carried out by the information relay terminals 8. The storage section 40 is a storage unit such as a battery backed up RAM, a flash ROM, or a hard disk for example. The information specific to each information relay terminal contains for example the addresses (such as IP (internet protocol) and MAC (media access control) addresses) of the information relay terminals 8, such addresses being necessary when the information relay terminals 8 send user information or the like of the game terminals to the server 6.

FIG. 30A shows an example data structure of user information according to the second embodiment. In the second embodiment, since the server supplies uncertain information relating to multiple games, there is the possibility that the uncertain information obtained by the game terminal has no relation to the game currently being executed on the game terminal. Accordingly, in addition to the data entries contained in the user information shown in FIG. 4, a "game title" is provided that specifies the game program being executed on the game terminal.

Description is omitted concerning items duplicated in FIG. 4. Using the "game title," it is possible to specify to which game each set of uncertain information relates and when uncertain information that is received has no relation to the game being executed on one's game terminal, the game terminal can discard the received uncertain information.

Figure 30:
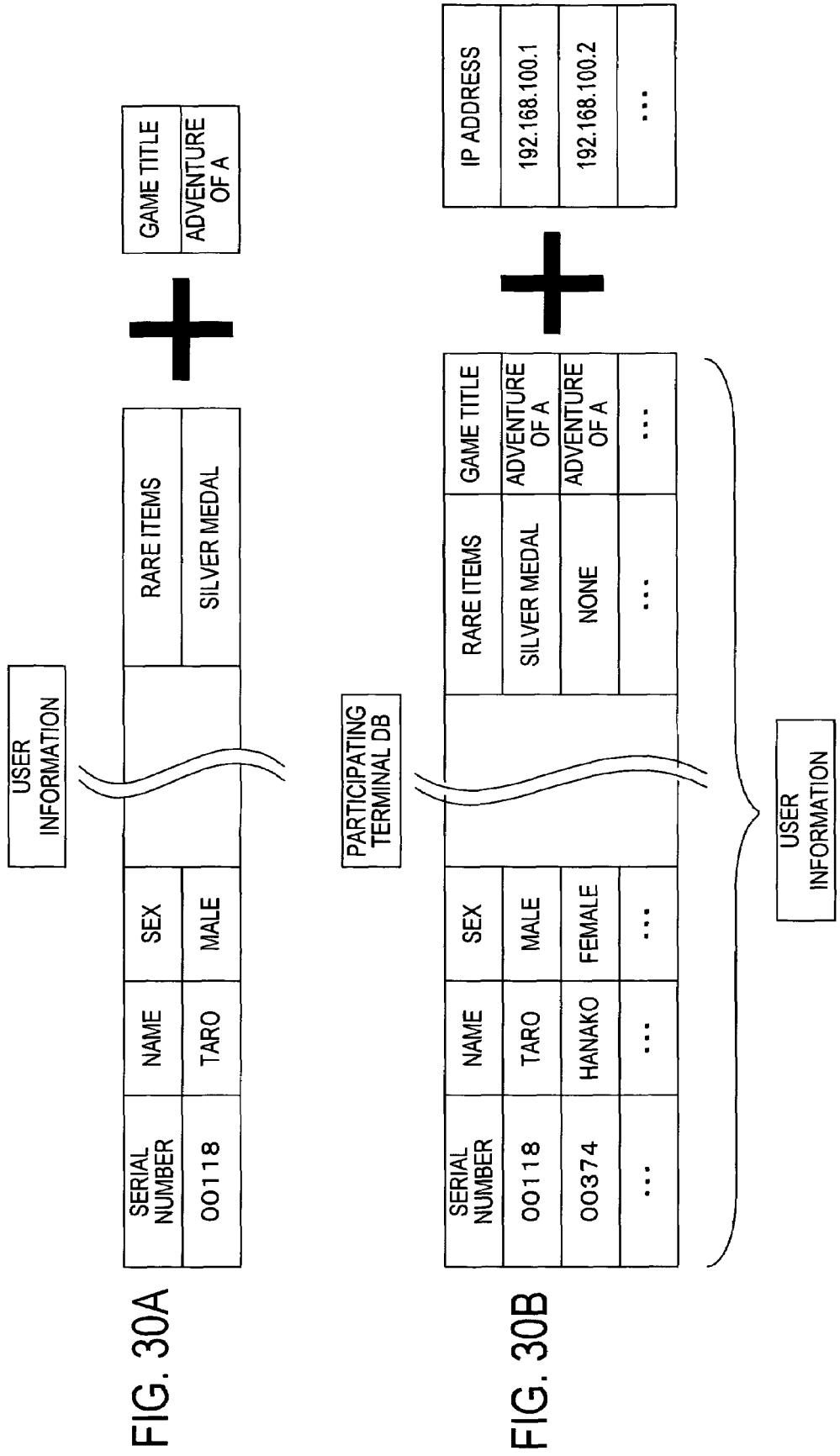
FIG. 30A shows an example data structure of user information according to a second embodiment.
FIG. 30B shows an example data structure of a participating terminal DB.

FIG. 30B shows an example data structure of the participating terminal DB 41 according to the second embodiment. In addition to data items contained in the user information shown in FIG. 30A, the participating terminal DB 41 shown in FIG. 30 contains IP addresses. In the "IP address" is stored the sender's IP address obtained from packets when the information relay terminals 8 obtain user information from the game terminals 1. The IP addresses are referenced when uncertain information sent from the server 6 is forwarded to the game terminals 1.

Figure 31:
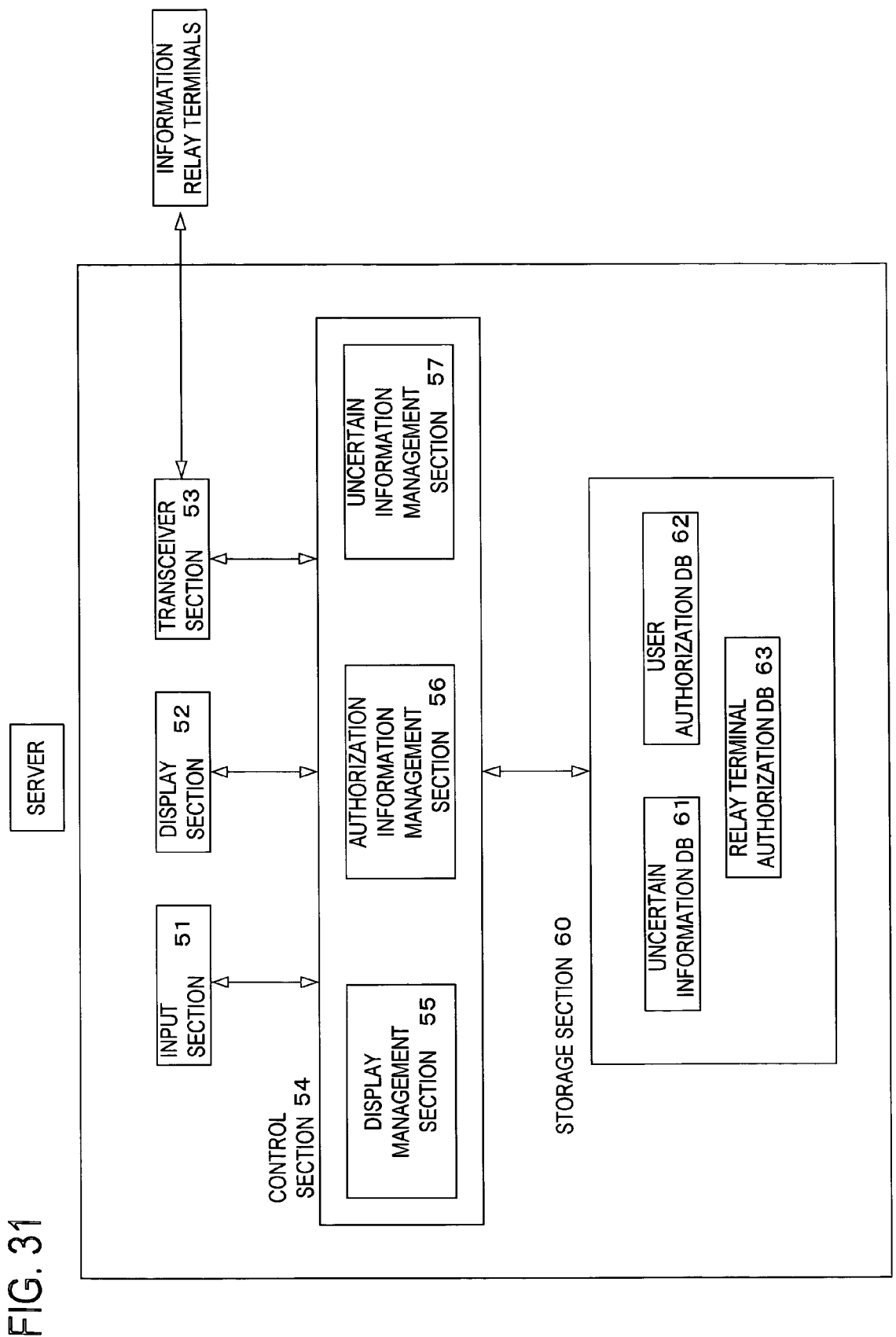
FIG. 31 is a block diagram illustrating a configuration of a server.

FIG. 31 is a block diagram illustrating a configuration of the server 6. The server 6 has an input section 51, a display section 52, a transceiver section 53, a control section 54, and a storage section 60, and the control section 54 includes a display management section 55, an authorization management section 56, and an uncertain information management section 57. In the present embodiment, the display management section 55, the authorization information management section 56, and the uncertain information management section 57 are program modules provided in the control section 54 and executed by a CPU omitted from the drawings, but these may also be achieved using hardware circuitry.

The display management section 55 displays screens for operating the server 6 on the display section 52, receives commands inputted by a server manager via the input section 51, and outputs screens in accordance with those commands. The input section 51 corresponds for example to a keyboard not shown in the drawings and the display section 52 corresponds for example to a liquid crystal display not shown in the drawings. The input section 51 and the display section 52 function as an interface to the server manager.

The authorization information management section 56 manages a relay terminal authorization database (relay terminal authorization DB) 63 used in authorizing the information relay terminals 8 that receive an obtain request for uncertain information and a user authorization database (user authorization DB) 52 by which a player who has performed an obtain request is authorized. Addresses (such as IP addresses and MAC addresses) that specify legitimate information relay terminals 8 are accumulated in advance via the input section 51 in the relay terminal authorization DB 63.

Furthermore, accumulated in advance in the user authorization DB 62 are serial numbers (see FIG. 4), which are contained in the user information of the users, that permit data entries stored in the uncertain information DB of the server 6 to be downloaded. In response to a request to obtain uncertain information DB, information contained in these databases is collated and a determination is made as to whether or not to permit sending of the data entries contained in the uncertain information DB 61.

In addition to the data entries received via the information relay terminals 8 and stored in the game terminals 1, the uncertain information management section 57 stores in the uncertain information DB 61 definite information (see description of "types" of FIG. 5) inputted via the input section 51 and uncertain information. Here, uncertain information is stored in the uncertain information DB in a same format as data entries whose content is varied in the process of propagation among game terminals. Furthermore, the uncertain information management section 57 deletes data entries that have become unnecessary due to expiry of a valid period limit or the like and manages the uncertain information DB 61. When a request to obtain information is received via the information relay terminals 8, the uncertain information management section 57 outputs uncertain information or definite information or both to the transceiver section 53 in accordance with the type of request.

The transceiver section 53 has a communication function of communicating with the information relay terminals 8 connected to the Internet 7. This may be achieved by a wireless communication function via a communication antenna built into or externally attached to the server 6, or wired communication may be conducted with connection by cable.

Stored in the storage section 60 are a control program not shown in the drawings, the user authorization DB 62, the relay terminal authorization DB 63, the uncertain information DB 61, and other data necessary in processes carried out by the server 6. The storage section 60 is a storage unit such as a battery backed up RAM, a flash ROM, or a hard disk for example.

Figure 32:
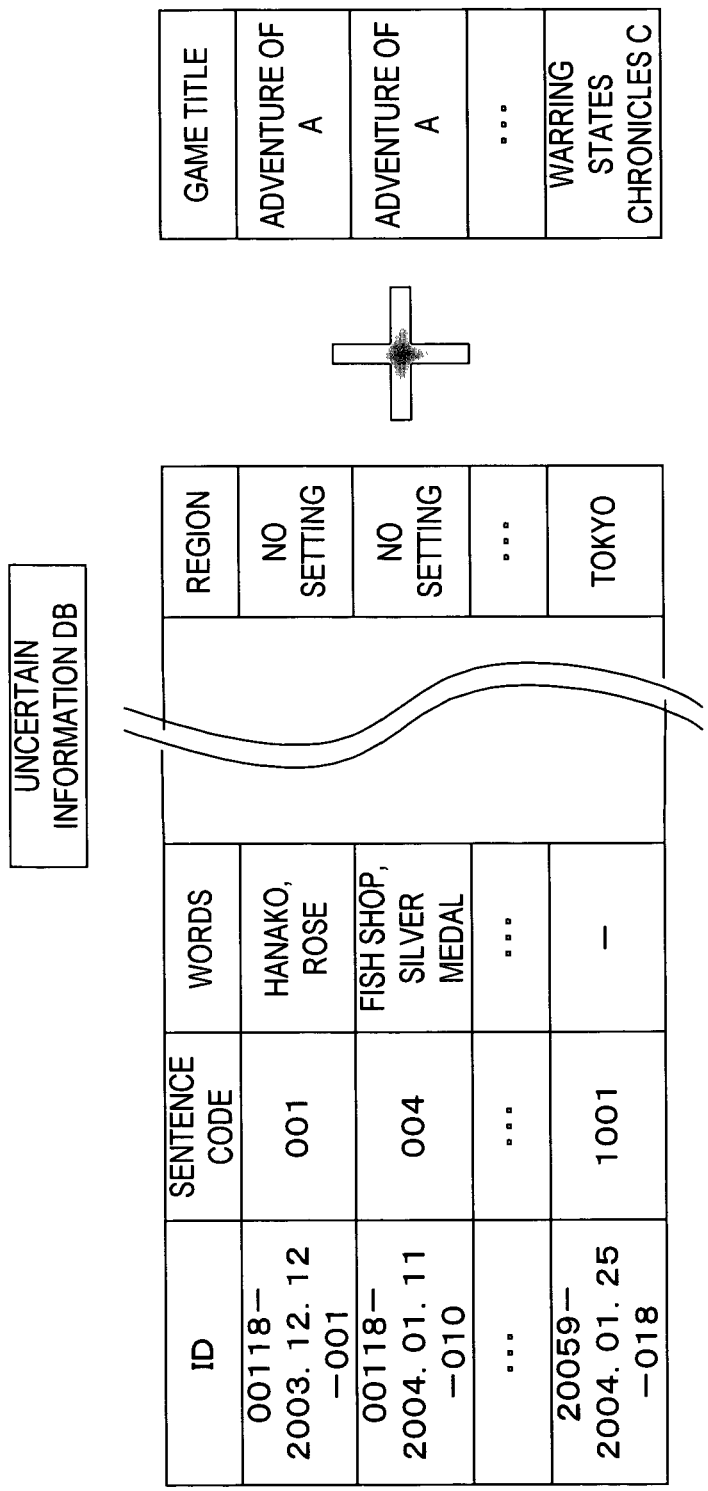
FIG. 32 shows an example data structure of the uncertain information DB according to the second embodiment.

FIG. 32 shows an example data structure of the uncertain information DB 61 according to the second embodiment. Since uncertain information relating to multiple game programs is stored in the server, in addition to the data items contained in the uncertain information DB (FIG. 5) of the first embodiment, the uncertain information DB shown in FIG. 32 is provided with "game titles" that specify to which game program the sets of uncertain information DB are related. Description relating to data items duplicated in FIG. 5 is omitted.

When the server stores uncertain information relating to multiple types of game programs, other than the technique of adding the "game title" data item to the user information and uncertain information DB as described in FIGS. 30A and 32, there are techniques for specifying the game program to which uncertain information relates without adding "game titles." These use the serial number.

FIG. 33 shows an example data structure of a software management table in which associative relations between serial numbers and game titles are stored. The software management table is stored in the storage section 60 of the server. In the second embodiment, serial numbers allotted for each game title are set in advance (for example, by the game maker or the like at the time of product shipping) in accordance with divisions shown in FIG. 33 and consequently the game program being executed on the game terminal can be specified using the serial number. The serial number is embedded (see FIG. 32) in the "ID" of each data entry and the game program being used can be specified without providing a game title in the user information and the uncertain information DB.

FIG. 34 shows an example data structure of the user authorization DB 62. In FIG. 34, the "serial numbers" (see user information in FIG. 4) are stored of users permitted to download data entries from the uncertain information DB stored in the server 6.

FIG. 35 shows an example data structure of the relay terminal authorization DB 63. In FIG. 35, the IP addresses of legitimate information relay terminals 8 are stored, but separate identifying information by which the information relay terminals 8 can be uniquely specified may also be used.

Figure 36:
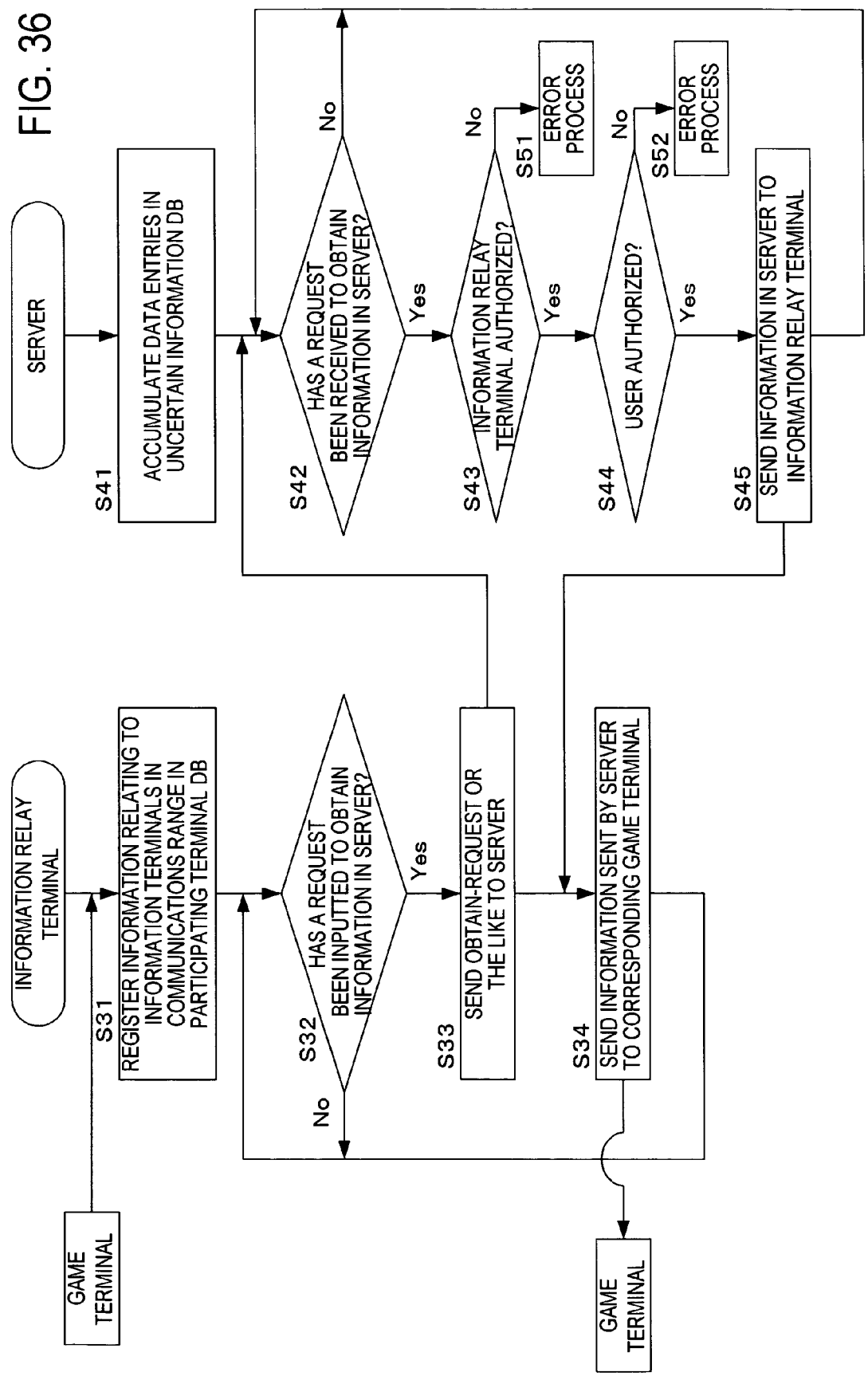
FIG. 36 is a time chart describing the action of the server and the information relay terminals according to the second embodiment.

FIG. 36 is a time chart describing the action of the server 6 and the information relay terminals 8 according to the second embodiment. Propagation of information among game terminals is also carried out in the second embodiment but this is achieved by the same actions as indicated in the first embodiment and therefore description here will focus on the actions of the information relay terminals and the server.

First, data entries are accumulated (S41) in the uncertain information DB of the server 6. There are two types of data entry accumulation into the uncertain information DB 61 of the server 6, these being when uncertain information generated in the server 6 is stored in the same manner as accumulation of data entries to the game terminals 1 according the first embodiment and when data entries received from game terminals via the information relay terminals 8 are stored. In regard to the first of these, the process described using FIG. 13C is carried out by the uncertain information management section 57 of the server 6. In regard to the latter, an interruptive step S41 is carried out when a data entry is received, after which control is conducted to return the process to as before.

On the other hand, the information relay terminals 8 register information relating to the game terminals 1 inside the communications range in the participating terminal DB 41 (S31). The transceiver section 33 (information relay terminal) carries out sending and receiving when the information relay terminal 8 and the game terminal are both in the communicable range and IP packets containing user information (see FIG. 30A) are sent from the game terminal 1 to the information relay terminal 8. The transceiver section 33 (information relay terminal) extracts the user information and the sender's address from the received IP packet, outputs to the participating terminal management section 36, then the participating terminal management section 36 stores these in the participating terminal DB 41. In this manner, the information relay terminals 8 accumulate information relating to communicable game terminals in the participating terminal DB 41.

At the information relay terminal 8, the display management section 35 displays on the display section 32 a menu of services the player can use, and by the player operating this menu via the input section 31, the information relay terminal 8 sends requests to the server to obtain uncertain information and definite information relating to the game played on that terminal. Accordingly, the display management section 35 makes a determination (S32) as to whether or not a request to obtain information stored on the server 6 has been inputted using the input section 31. When a request to obtain information stored on the server 6 has been inputted, the information relay terminal 8 sends (S33) to the server 6 the obtain request that has been inputted, the user information of the game terminal 1 that has made the request stored in the participating terminal DB 41, the data entries stored in the uncertain information portion DB of that game terminal 1, and identifying information 42 of the information relay terminal 8.

When a request to obtain information stored in the server 6 is received (yes at S42), the server 6 stores the subsequently received data entry in the uncertain information DB as an interrupt process and performs information relay terminal authorization (S43) based on the received identifying information. Here the authorization management section 56 may carry out a determination as to whether or not an IP address that matches the sender's IP address contained in the received packet is stored in the relay terminal authorization DB 63. When no matching number is stored (no at S43), it is not a request for information sent via a legitimate information relay terminal 8, and therefore an error process is carried out (S51). In the error process of step S51, the IP address of the information relay terminal 8 that has made an illicit request to obtain information is recorded as a log for example.

When the information relay terminal authorization is successful at step S43 (yes at S43), next user authorization is carried out (S44) based on the user information. The authorization information management section 56 extracts the serial number from the received user information and examines whether or not it matches one of the serial numbers stored in the user authorization DB 62. If there is no matching number (no at S44), the obtain request is not from a registered user and an error process is carried out (S52). The error process of step S52 involves for example the server 6 notifying the information relay terminal 8 of the error of being unregistered, then the information relay terminal 8 displaying on the display section 32 that the user is unregistered and moreover displaying a screen prompting the user to register.

When the user authorization is successful (yes at S44), the server 6 sends (S45) information according to the obtain request to the information relay terminal 8, then returns to S42 and stands by ready for other obtain requests from the information relay terminal 8. Then, the information relay terminal 8 sends (S34) the information sent from the server 6 to the corresponding game terminal 1, returns to step S32, and waits for input from a player of a new request to obtain information stored in the server 6.

Furthermore, although omitted from the flowchart in FIG. 36, in the second embodiment, in relation to the server providing uncertain information relating to multiple types of game programs, it is possible that the uncertain information received by the game terminals is not related to the game executed on that game terminal. Consequently, a process may be carried out in the game terminal that receives information sent in step S34 involving discarding that uncertain information when the "game title" of the received uncertain information and the "game title" contained in the user information of that terminal are referenced and do not match.

Also, as described in FIG. 33, when not using the "game title" but using the serial number to specify to which game program uncertain information relates, first the server 6 specifies the game title using the software management table shown in FIG. 33 from the "serial number" contained in the user information sent in step S33. Then, when the uncertain information is to be sent in step S45, the server may be configured to send to the information relay terminals only the uncertain information whose serial number, which is extracted from the "ID" of the uncertain information scheduled to be sent, is contained in the serial number range in the software management table associated to the (specified) game title being executed on the game terminal. By restricting the uncertain information sent by the server based on the serial numbers, it is possible to prevent a game terminal from receiving uncertain information that is unrelated to the game program being executed on that terminal.

Figure 37:
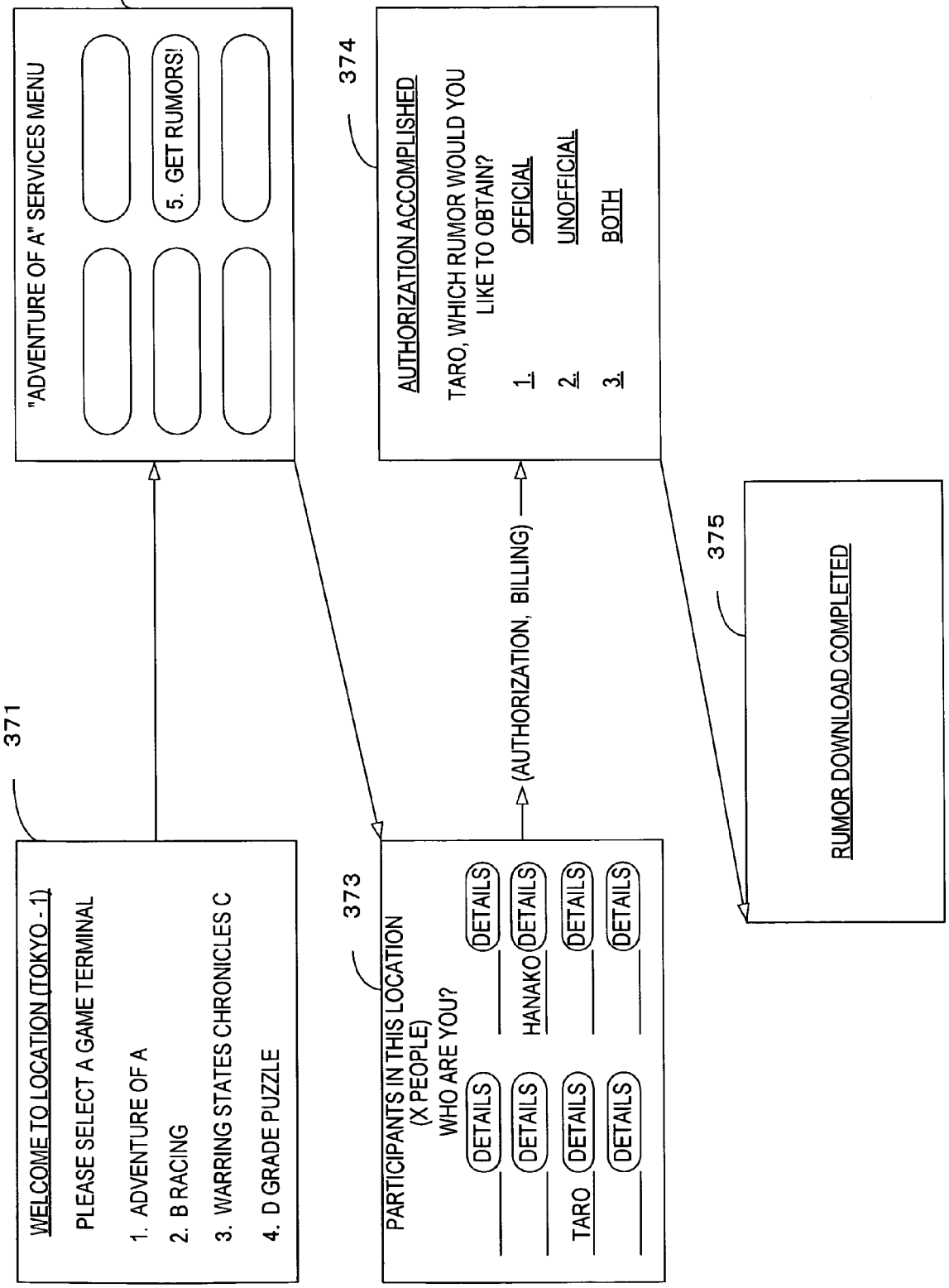
FIG. 37 shows example screens of the information relay terminals for describing a manner in which information stored on the server is downloaded to the game terminals.

FIG. 37 shows example screens of the information relay terminals 8 for describing a manner in which information stored on the server 6 is downloaded to the game terminals 1. The display section 32 of the information relay terminal 8 first displays (screen 371) game titles provided as a service. The screen 371 displays the name of the information relay terminal 8 and four game titles. Here, menu item 1 (Adventure of A) is selected as the game to be used in the second embodiment. Then displayed next is a list of services being provided in relation to "Adventure of A" (screen 372).

Next, menu item 5 (Get rumors!) is selected to download information stored in the server 6. Then the participating terminal DB 41 is read out and "Names" (see FIG. 30) stored in the participating terminal DB 41 are displayed (screen 373). From these, the user selects his player name.

Sometimes, among the participants there may be a person having the same player name as oneself. For this situation, a "details" button is provided on screen 373 and by pressing this button a user can view details of the user information. The user information contains the serial number (see FIG. 4) and therefore the person can confirm the details by comparing the serial number displayed on an information providing terminal 2 and the person's own serial number. The person's own serial number can be confirmed on the information terminal 1 (see FIG. 14).

Then, when the player is selected, a screen is displayed (screen 374) for selecting information to be downloaded. Here, menu item 1 (official information) is selected and the process shown in step S33 of FIG. 36 is executed. Supposing that the player selected on screen 373 is "Taro," the information relay terminal 8 sends to the server 6 the obtain request for official information, the user information of "Taro" stored in the participating terminal DB 41, the data entries stored in the uncertain information DB of the game terminal 1 of "Taro," and identifying information 42 of the information relay terminal 8.

The server performs authorization of the information relay terminal, then user authorization is performed by confirming whether or not this is a user whose serial number contained in the user information of "Taro" is registered in the user authorization DB, and if both of these authorizations are successful, the "type" 1 data entries (see FIG. 5A) of the data entries stored in the uncertain information DB of the server 6 are sent to the information relay terminal 8.

The information relay terminal 8 references the "address" of the entry from the participating terminal DB 41 corresponding to "Taro" then obtains the IP address of the game terminal of "Taro" and creates a packet containing the data entries received from the server and addressed to that IP address for sending to the game terminal.

Then, when downloading is completed, a completion screen is displayed (screen 375). If menu item 2 is selected at screen 374, "type" zero (uncertain) data entries of the information stored in the uncertain information DB of the server 6 are sent and if menu item 3 is selected, data entries are regardless of "type."

Also, in order to confirm that the player name selected at screen 373 and the person actually carrying out a series of operations on the information providing terminal, an authorization process may be conducted between the processes of screen 373 and screen 374. When paid services are also provided, a billing process may also be conducted.

Figure 38:
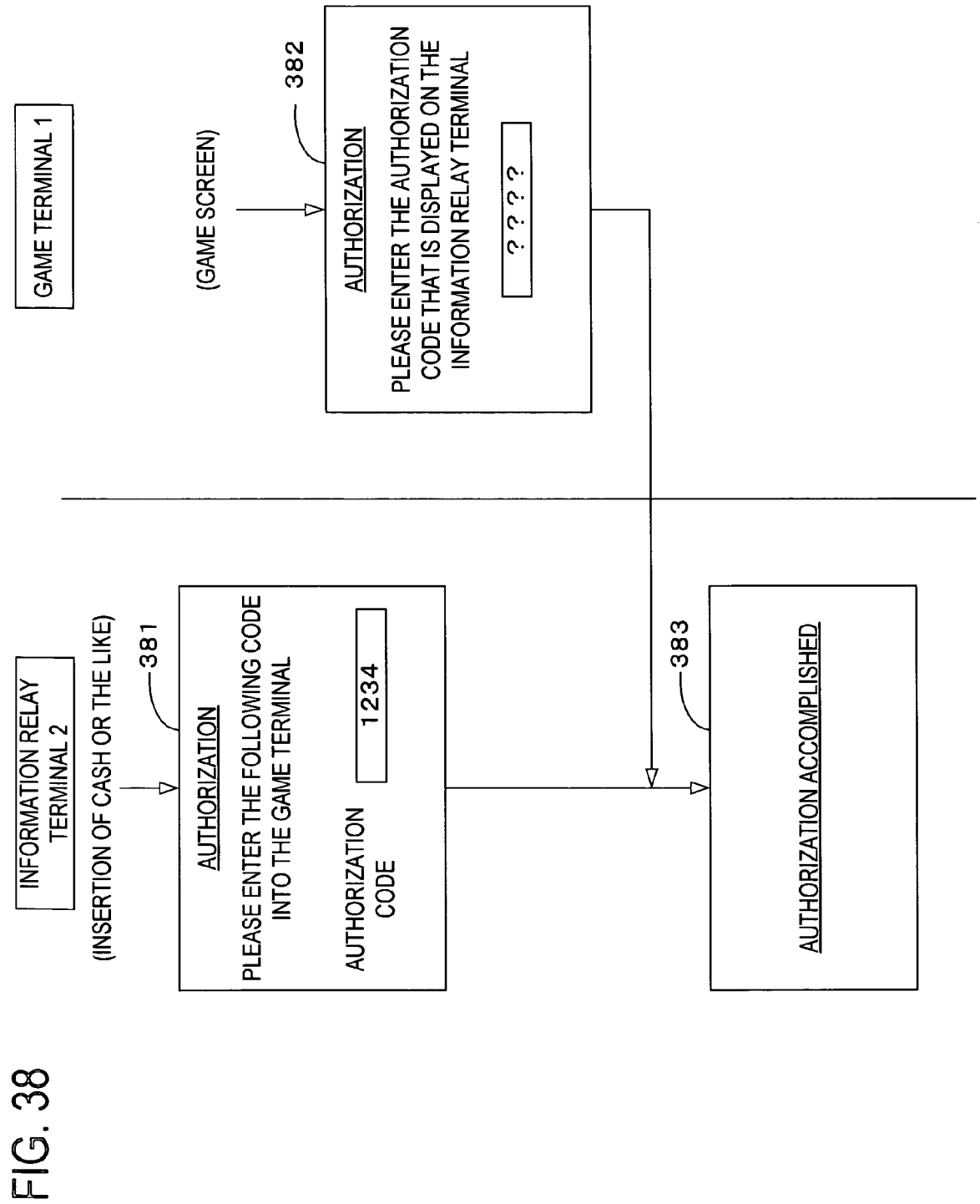
FIG. 38 shows example screens describing an example of authorization and billing processes.

FIG. 38 shows example screens describing an example of authorization and billing processes. After screen 373 shown in FIG. 37, the information providing terminal 2 displays (screen 381) a number for authorization (authorization code). This is a number randomly generated by the authorization management section. Then, the game terminal of the player selected at screen 373 displays a screen (screen 382) for inputting the authorization code.

The player then inputs the authorization code displayed on screen 381 into the game terminal. The inputted number is sent to the information relay terminal 8 and the information relay terminal 8 checks that the same number as the authorization code displayed at screen 381 is inputted and authorization is complete (screen 383). If the number received from the game terminal and the displayed authorization code do not match, authorization has failed and information cannot be downloaded.

Furthermore, by making a setting such that the screen 381 does not display unless after a billing process such as insertion of cash or the like has been carried out prior to screen 381, the billing process and the authorization process can be achieved at one time. With this authorization technique, even if a person inadvertently selects a character at screen 383 other than the one they are operating, authorization does not succeed if the person does not know the authorization code displayed on the information relay terminal 81 and therefore the likelihood of player being authorized other than the real person is low.

Thus, with the second embodiment, definite information that is not varied in the process of data entry propagation is stored on the server and definite information can be propagated to the game terminal (information terminal). Thus, a game maker can propagate to the game terminals information that is announced as public information in real time as well as with appropriate timing. Moreover, a customer-attracting effect can be anticipated by installing information relay terminals.

Also, by storing on the server uncertain information from the game terminals, a player who usually does not have other players playing the game nearby can download uncertain information from the server via the information relay terminal and obtain uncertain information from an entire nation. Furthermore, it is possible to create definite information using only the server 6 and therefore fake definite information will not be created. With definite information, time-limited events can be achieved within the game or notification can be given that an event is to be held in the real world, thereby enabling the enjoyableness of the game to be further increased.

It should be noted that in the second embodiment it is possible to omit the information relay terminal 2 by enabling the game terminals 1 to connect directly to a server 3.

What is claimed is:

1. A method of communicating information among video game devices, the method comprising:
   in a first video game device, generating a first message by inserting a first set of words into respective blanks in a first phrase;
   transferring the first message from the first video game device to a second video game device;
   in the second video game device, generating a second message by inserting a second set of words into respective blanks in a second phrase, wherein the second set of words is a subset of the first set of words; and
   transferring the second message from the second video game device to a third video game device.

2. The method of communicating information among video game devices of claim 1, further comprising:
   in the third video game device, generating a third message by inserting a third set of words into respective blanks in a third phrase, wherein the third set of words is a subset of the second set of words.

3. The method of communicating information among video game devices of claim 1, wherein the first set of words contains at least two words and the second words contains exactly one word.

4. The method of communicating information among video game devices of claim 1, wherein at least one word in the first set of words is specified by a player using the first video game device.

5. The method of communicating information among video game devices of claim 1, further comprising:
   determining a degree of accuracy associated with the first and second messages.

6. The method of communicating information among video game devices of claim 5, wherein the degree of accuracy associated with the first message is greater than the degree of accuracy associated with the second message.

7. The method of communicating information among video game devices of claim 5, wherein the degree of accuracy associated with a message is based at least in part on the number of times the message has been transferred.

* * * * *